(12) United States Patent
Mariotto

(10) Patent No.: US 10,281,162 B2
(45) Date of Patent: May 7, 2019

(54) ENTHALPY EXCHANGER INCLUDING STACKED NETWORKS AND SELECTIVELY PERMEABLE MEMBRANES

(71) Applicant: COMMISSARIAT A L'ENERGIE ATOMIQUE ET AUX ENERGIES ALTERNATIVES, Paris (FR)

(72) Inventor: Mathieu Mariotto, Villard-Bonnot (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 195 days.

(21) Appl. No.: 15/328,544

(22) PCT Filed: Jul. 29, 2015

(86) PCT No.: PCT/EP2015/067425
§ 371 (c)(1),
(2) Date: Jan. 24, 2017

(87) PCT Pub. No.: WO2016/016330
PCT Pub. Date: Feb. 4, 2016

(65) Prior Publication Data
US 2017/0211826 A1    Jul. 27, 2017

(30) Foreign Application Priority Data
Jul. 31, 2014   (FR) .................................. 14 57421

(51) Int. Cl.
*F28D 17/00*   (2006.01)
*F24F 3/147*   (2006.01)
(Continued)

(52) U.S. Cl.
CPC ............ *F24F 3/147* (2013.01); *F28D 9/0037* (2013.01); *F28D 21/0015* (2013.01);
(Continued)

(58) Field of Classification Search
CPC .. F24F 3/147; F24F 2003/1435; F24F 12/006; F28D 9/0037; F28D 21/0015;
(Continued)

(56) References Cited

U.S. PATENT DOCUMENTS 3,834,544 A * 9/1974 Tyson, Jr. ........... A61M 1/1698
210/321.75
4,832,115 A * 5/1989 Albers ..................... B01D 1/14
165/104.31

(Continued)

FOREIGN PATENT DOCUMENTS

CA          2805541 A1     9/2013
DE    202008010685 U1    10/2009
(Continued)

OTHER PUBLICATIONS

U.S. Appl. No. 14/413,640, filed Jan. 8, 2015, 2015/0136201 A1, Mathieu Mariotto et al.

(Continued)

*Primary Examiner* — Ljiljana V. Ciric
(74) *Attorney, Agent, or Firm* — Oblon, McClelland, Maier & Neustadt, L.L.P.

(57) ABSTRACT

A dual air flow exchanger, allowing a heat transfer and humidity transfer between two air flows, and including a plurality of first and second air circulation networks separated by membranes permeable to water vapor and impermeable to air and to liquid water, each of the first and second networks including cells each defined by a wall including openings for passage of air, the cell wall including two opposing edges at which same is open in a direction of stacking. For at least one of the first networks, at least one of the two opposing edges of each cell wall defines a hollow (Continued)

open in a direction of the second directly consecutive air circulation network, the hollows receiving a part of the second network.

19 Claims, 27 Drawing Sheets

(51) Int. Cl.
F28D 21/00 (2006.01)
F28D 9/00 (2006.01)
F24F 12/00 (2006.01)
F24F 3/14 (2006.01)

(52) U.S. Cl.
CPC ..... F24F 12/006 (2013.01); F24F 2003/1435 (2013.01); F28D 2021/0033 (2013.01); F28D 2021/0035 (2013.01); Y02B 30/563 (2013.01)

(58) Field of Classification Search
CPC ..... F28D 2021/0033; F28D 2021/0035; Y02B 30/563
See application file for complete search history.

(56) References Cited

U.S. PATENT DOCUMENTS

| | | | | |
|---|---|---|---|---|
| 4,982,782 | A * | 1/1991 | Albers | B01D 1/14 165/111 |
| 5,020,335 | A * | 6/1991 | Albers | B01D 1/14 62/271 |
| 5,123,481 | A * | 6/1992 | Albers | B01D 1/14 165/111 |
| 5,976,220 | A * | 11/1999 | Braun | B01D 46/005 55/385.2 |
| 7,770,407 | B1 * | 8/2010 | Haskell | F28D 15/0266 62/315 |
| 8,157,891 | B2 * | 4/2012 | Montie | B01D 46/0001 55/521 |
| 8,919,746 | B2 * | 12/2014 | Vanderwees | H01M 8/04074 261/102 |
| 8,968,945 | B2 * | 3/2015 | Fasold | B01D 63/085 429/413 |
| 9,028,989 | B2 * | 5/2015 | Zhang | H01M 8/04141 137/100 |
| 9,194,630 | B2 * | 11/2015 | Mariotto | F24F 3/147 |
| 9,343,755 | B2 * | 5/2016 | Vanderwees | H01M 8/04141 |
| 9,429,366 | B2 * | 8/2016 | Dubois | B01D 53/228 |
| 9,562,726 | B1 * | 2/2017 | Eplee | F28D 21/0015 |
| 9,634,340 | B2 * | 4/2017 | Martinchek | H01M 8/04291 |
| 9,816,760 | B2 * | 11/2017 | LePoudre | F28F 9/026 |
| 2002/0134087 | A1 * | 9/2002 | Urch | F28D 9/0025 62/3.2 |
| 2003/0094269 | A1 | 5/2003 | Arai et al. | |
| 2003/0106680 | A1 * | 6/2003 | Serpico | B01D 53/268 165/166 |
| 2003/0154724 | A1 * | 8/2003 | Urch | F24F 12/006 62/3.2 |
| 2004/0134210 | A1 | 7/2004 | Yabu et al. | |
| 2006/0168813 | A1 | 8/2006 | Arai et al. | |
| 2008/0085437 | A1 * | 4/2008 | Dean | B01D 53/268 429/413 |
| 2008/0210412 | A1 | 9/2008 | Arai et al. | |
| 2009/0151923 | A1 * | 6/2009 | Fedorov | F28D 15/046 165/185 |
| 2009/0211977 | A1 * | 8/2009 | Miller | B01D 63/082 210/646 |
| 2009/0325034 | A1 * | 12/2009 | Kobayashi | H01M 8/04149 429/420 |
| 2010/0151337 | A1 * | 6/2010 | Kanazawa | H01M 8/04126 429/413 |
| 2011/0036541 | A1 * | 2/2011 | Takada | F24F 12/006 165/59 |
| 2011/0146961 | A1 | 6/2011 | Imai et al. | |
| 2012/0061045 | A1 * | 3/2012 | Huizing | B01D 53/268 165/10 |
| 2012/0174790 | A1 * | 7/2012 | Osabe | B01D 65/10 96/7 |
| 2012/0181712 | A1 * | 7/2012 | Vanderwees | H01M 8/04074 261/102 |
| 2013/0233514 | A1 * | 9/2013 | Mariotto | F24F 3/147 165/104.14 |
| 2014/0326432 | A1 * | 11/2014 | Dean | F28D 9/0037 165/54 |
| 2015/0180059 | A1 * | 6/2015 | Vanderwees | H01M 8/04074 261/102 |
| 2015/0325868 | A1 * | 11/2015 | Fasold | H01M 8/04149 429/413 |
| 2016/0322655 | A1 * | 11/2016 | Staeck | H01M 8/04141 |
| 2018/0340741 | A1 * | 11/2018 | Riendeau | B23P 15/26 |

FOREIGN PATENT DOCUMENTS

| | | |
|---|---|---|
| DE | 102012024549 A1 | 6/2014 |
| EP | 1312870 A2 | 5/2003 |
| EP | 1408288 A1 | 4/2004 |
| EP | 2138792 A1 | 12/2009 |
| JP | 2009-2575 A | 1/2009 |
| WO | 2012/045717 A1 | 4/2012 |
| WO | 2013/091099 A1 | 6/2013 |

OTHER PUBLICATIONS

U.S. Appl. No. 14/901,135, filed Dec. 28, 2015, 2016/0156306 A1, Mathieu Mariotto et al.
U.S. Appl. No. 15/027,197, filed Apr. 4, 2016, 2016/0252262 A1, Mathieu Mariotto et al.
International Search Report dated Dec. 4, 2015, in PCT/EP2015/067425, filed Jul. 29, 2015.
French Search Report dated Feb. 13, 2015, in French Patent Application 1457421, filed Jul. 31, 2014.

* cited by examiner

US 10,281,162 B2

ENTHALPY EXCHANGER INCLUDING STACKED NETWORKS AND SELECTIVELY PERMEABLE MEMBRANES

The invention relates to the field of dual air flow exchangers, of the type allowing for a heat transfer as well as a humidity transfer between the two air flows passing through the exchanger. Such an exchanger providing this dual transfer is also commonly referred to as "total exchange" or "enthalpy exchanger".

The invention applies more preferably to the field of systems for treating and conditioning air, for buildings, residences or tertiary. In this application, the exchanger guarantees a heat transfer between the vitiated air flow and the flow of fresh air, but also a humidity transfer between these two flows, from the most humid area to the driest area.

The invention has applications in other technical fields, for example in the cryogenics field or that of recovering heat.

Such exchangers are widely known in prior art, in particular in documents CA 2 805 541 and WO 2013/091099. Document WO2012/045717 is also known, which relates to an enthalpy exchanger with improved performance, substantially thanks to the implementation of cells oriented parallel to the direction of stacking of membranes and of air circulation networks integrating these cells.

However, such exchangers must be further optimised, in particular in terms of compactness and performance of heat transfer.

In order to meet this need, the invention has for object a dual air flow exchanger, allowing for a heat transfer and a humidity transfer between the two air flows, and comprising a plurality of first and second air circulation networks stacked alternately according to a direction of stacking and separated two-by-two by membranes that are permeable to water vapour and impermeable to air and to liquid water, each one of the first and second air circulation networks comprising cells each defined by a wall provided with openings for the passage of air, said cell wall comprising two opposing edges on which said cell is open in the direction of stacking. According to the invention, for at least one of the first air circulation networks, at least one of the two opposing edges of each cell wall defines a hollow open in the direction of the second directly consecutive air circulation network, said hollows receiving a part of this second network.

As such, the invention makes it possible to benefit from all of the advantages procured by the presence of cells within air circulation networks, while still offering improved compactness and heat transfer performance. Effectively, the hollows defined by the edges of the cell walls allow for a nesting of the second network in the first network, in the direction of stacking. This nesting results indeed in a greater compactness of the exchanger, but also in better thermal performance. This latter advantage can be explained by the fact that the exchange interface between the two air flows is no longer substantially flat, but structured thanks to the careful presence of the aforementioned hollows. This structuring allows for a design wherein the heat transfers are no longer carried out only at the top and bottom ends of the networks in the stacking, but also laterally. In other terms, the heat exchange surfaces are no longer planes parallel with each other and orthogonal to the direction of stacking, but more complex surfaces, of non-straight section. Moreover, these heat exchange surfaces can have as a section the shape of broken lines of the triangle signal type, which, when they are superimposed in the direction of stacking, make it possible to reach a design referred to as a checkerboard, staggered, or similar. This type of design advantageously favours the relationship between the extent of the exchange surface and the global volume of the exchanger.

Furthermore, it is noted that the presence of cells within the air circulation networks makes it possible to optimise the heat transfers between the two air flows. Indeed, the cell walls make it possible to constitute a secondary exchange surface. This secondary surface, provoking a so-called "fin" effect, is furthermore increased again when some of the faces of these cells remain non-perforated. Furthermore, still due to the specific orientation of the cells, i.e. substantially orthogonally to a main direction of circulation of the air in the networks, a recirculation of fluid is created that optimises the convective exchanges between the air flow and the membranes. This recirculation can be adapted according to the needs encountered, by carefully choosing the faces of the cells to be perforated, and those to be retained. The obstacles created by the cell walls also prevent the formation of a limit layer in the flow.

The invention is also remarkable in that it makes it possible to favour the transfer of humidity between the two air flows, by maintaining a large part of the membranes active. Indeed, each membrane permeable to water vapour and impermeable to air and to liquid water is only in contact with the edges of the cells, which arranges a substantial remaining useful surface for the transfer of water vapour.

The mechanical resistance of the exchanger is moreover very satisfactory, thanks to the use of honeycomb structures and to the specific orientation of its cells. The maintaining of membranes and of networks, relatively to one another, is also facilitated by the presence of the hollows. This improved maintaining provides a better seal as well as increased service life for the membranes.

The invention moreover has at least one of the following optional characteristics, taken individually or in combination.

For at least one of the second air circulation networks, at least one of the two opposing edges of each cell wall defines a hollow open in the direction of the first directly consecutive air circulation network, said hollows receiving a part of this first network. This specificity makes it possible to further increase the nesting of the networks, for obtaining greater compactness and better heat transfer performance.

The two opposing edges, of each cell wall of at least one of the circulation networks, each defines a hollow open in the direction of the directly consecutive network, and receiving a part of this directly consecutive network. In this preferred arrangement, the network concerned allows for a nesting with the two networks located on either side of the latter. This further increases the compactness and the effectiveness of the heat transfer. Preferably, this dual nesting is retained for all of the networks of the exchanger, with the exception of course of the first and of the last network of the stacking.

The first and second air circulation networks have identical structures, and for at least one first and one second directly consecutive networks in the stacking, the structure of the first network is shifted from the structure of the second network in the plane orthogonal to the direction of stacking, in order to allow the hollows of the first network to receive a part of the second network, and reciprocally. The structural identity of the networks makes it possible to facilitate the manufacture of the exchanger. The desired shift between two directly consecutive networks can for example be obtained using two identical elements forming the networks, with these two elements than being placed in one direction then in the other in the stacking.

Preferably, each first and second air circulation network is carried out using a mesh that is repeated, with the mesh comprising said cell wall, and also preferably comprising a connecting rod of the cells. As mentioned hereinabove, the mesh is preferentially identical for the first and second air circulation networks, in order to obtain the same structures for these networks.

Each first and second air circulation network has a plane of symmetry orthogonal to the direction of stacking, even if it could be otherwise, without leaving the scope of the invention.

The cells are preferably cylindrical with a non-circular section and with axes parallel to said direction of stacking.

Preferably, said cell wall has a globally hexagon shape when it is viewed according to the direction of stacking. Other shapes are possible, in particular other polygon shapes as a view according to the direction of stacking, without leaving the scope of the invention.

With this general hexagon shape, said cell wall has six faces, of which two opposite faces arranged substantially parallel to a main direction air of circulation through the network concerned, and two pairs of two faces passed through by air, with the two pairs being connected by said two opposite faces.

Said opposite faces of the cells, parallel to the main direction of circulation of the air, are in succession therefore according to this same direction, by being spaced from one another. This intermittence, in the main direction of air circulation, not only makes it possible to ensure a mechanical maintaining of the structure of the exchanger, but it also makes it possible to fulfil a function of improving the heat transfers, via a repeated action of generating turbulences. This generation of turbulence is not only conducive to the creating of a zone of recirculation, but also makes it possible to limit the risks of creating a limit layer which could be detrimental to the effectiveness of the heat exchange.

Preferably, each aforementioned pair comprises two faces of a globally triangular shape, with the two faces being connected to one another by one of their vertices. This arrangement is particularly conductive to the obtaining of a configuration referred to as a checkerboard or staggered, with the aforementioned vertices corresponding to the bow ties of the checkerboard.

Preferably, the rod of the mesh is connected to said vertex, from which it protrudes preferably in a plane orthogonal to the direction of stacking.

Preferably, said two opposite faces of the cell wall are solid or perforated. The solid nature of these faces makes it possible to reinforce the mechanical resistance and the heat transfers. However, the implementation of openings within these opposite faces, parallel to the main direction of circulation of the air, makes it possible to limit load losses. A compromise can naturally be found, according to the needs encountered.

The exchanger comprises, associated with each circulation network, an air distributor as well as an air collector, said distributors and collectors being stacked according to said direction of stacking. In the case of a counter-current design, the distributors and the collectors are stacked alternately. On each side of the stacking of the networks, the distributors and the collectors can be carried out using identical elements placed alternatively in one direction then in the other in the stacking.

As mentioned hereinabove, the exchanger is configured so that the circulation of air inside the exchanger is carried out more preferably as a counter-current, or as a co-current. A cross-current solution can be considered, but is not preferred.

Said membranes are more preferably made from a polymer material or from paper, while said networks are more preferably metal, but can also be made of a polymer material.

Finally, the invention also has for object a system for treating and conditioning air comprising an exchanger such as described hereinabove.

Other advantages and characteristics of the invention shall appear in the detailed non-limiting description hereinbelow.

This description shall be provided with regards to the annexed drawings among which;

FIG. 17 shows a view similar to that of FIG. 8, with the air circulation networks comprising faces of cells of the type of that shown in FIG. 16a;

Figure 1:
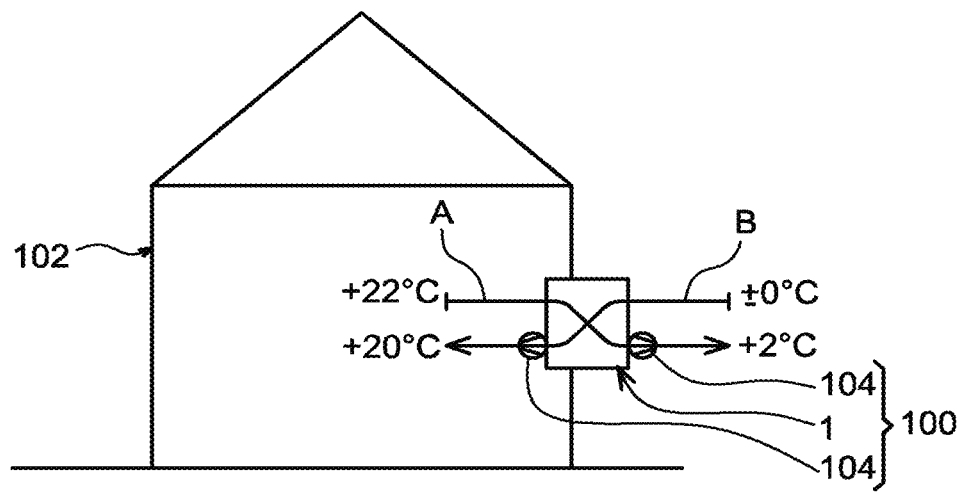
FIG. 1 shows a front diagrammatical view of a system for treating and conditioning air comprising a dual air flow exchanger according to this invention.

In reference first of all to FIG. 1, a system for treating and for conditioning air 100 is shown, provided in a building 102. This system 100 comprises in particular a dual air flow exchanger 1, proper to this invention. Here, the exchanger 1 guarantees a heat transfer between the vitiated air flow A exiting the building 102, and the fresh air flow B entering into this same building. In other terms, in addition to renewing the air of the building 102, the system 100, thanks to its heat exchanger 1, makes it possible to recover the heat or the coolness contained in the vitiated air A removed from the housing, and to supply it to the incoming fresh air flow B. The system 100 therefore makes it possible to avoid the wasting of energy for the heating or the air conditioning of the building 102.

By way of example, the vitiated air flow A can have a temperature of 22° C. before exiting the building, and the flow of fresh air B can have a temperature of 0° C. before entering the building. After heat transfer in the exchanger, the flow B can reach 20° C. when exiting the exchanger and entering the building, and the flow A can be cooled to a temperature of 2° C. when exiting the exchanger and the building. On this case, in heating mode, the incoming air is cold and dry, and the exchanger makes it possible to humidify and to preheat this incoming dry air to acceptable thermal comfort conditions. At the same time, the vitiated air is cooled and is discharged on the one hand of its humidity.

However, other operating modes are possible. First of all, in air conditioning mode with the incoming hot and wet air, the exchanger makes it possible to dehumidify and to cool this incoming air to acceptable thermal comfort conditions. The vitiated air is heated and is loaded with humidity. Furthermore, in air conditioning mode with the incoming hot and dry air, the exchanger makes it possible to humidify and to cool the incoming air to acceptable thermal comfort conditions. Indeed, the vitiated air is heated and here is discharged on the one hand of its humidity.

In order to allow for the circulation of the flows A and B, the system 100 is supplemented with two fans 104, shown diagrammatically in FIG. 1.

As mentioned hereinabove, the exchanger 1 is therefore also designed to provide a humidity transfer between these two flows A and B, from the most humid area to the driest area. This exchanger 1 is therefore qualified as total exchanger or an enthalpy exchanger.

Figure 2:
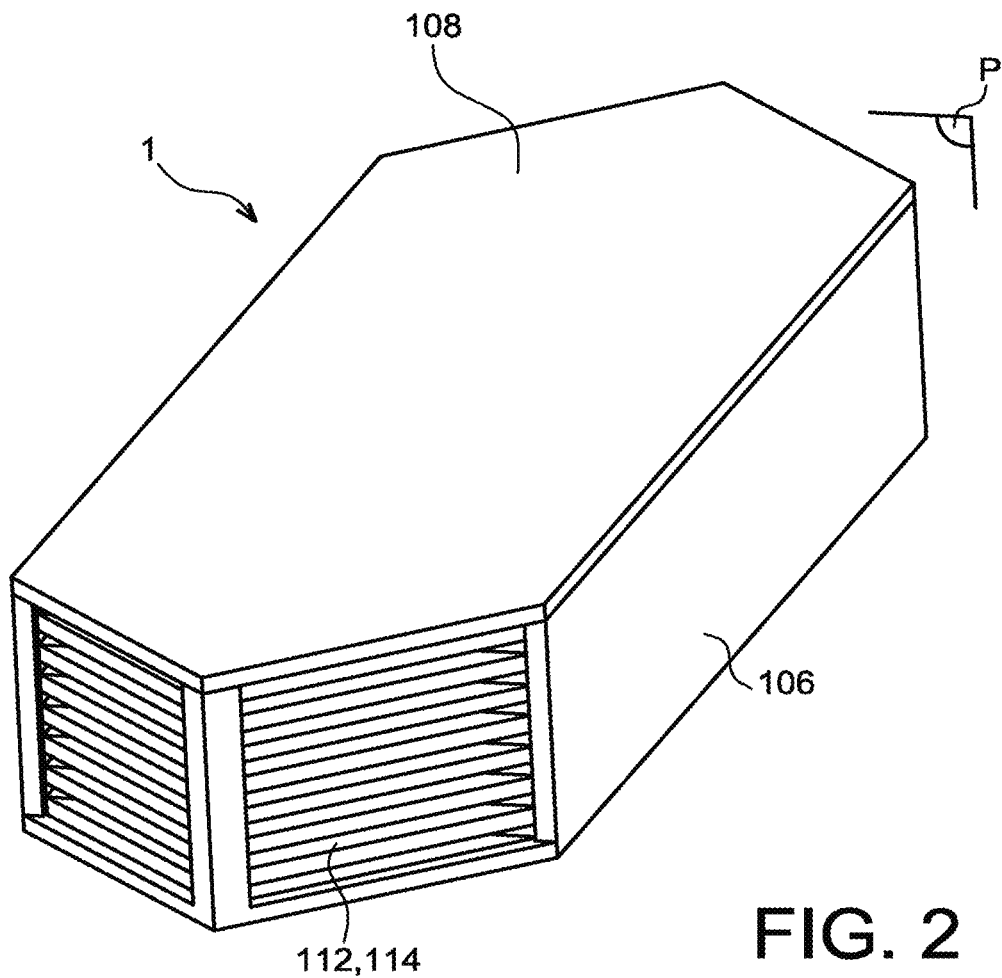
FIG. 2 shows, in more detail, a diagrammatical view in perspective of the exchanger shown in FIG. 1.
Figure 2A:
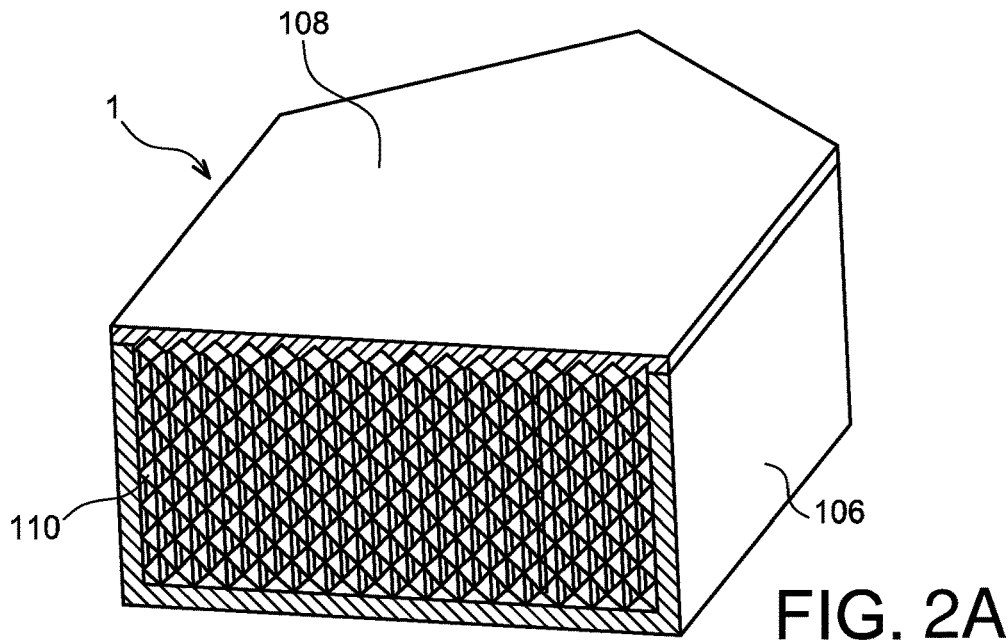
FIG. 2A is a view of the exchanger shown in the preceding figure, cut by a plane in its centre.
Figure 3:
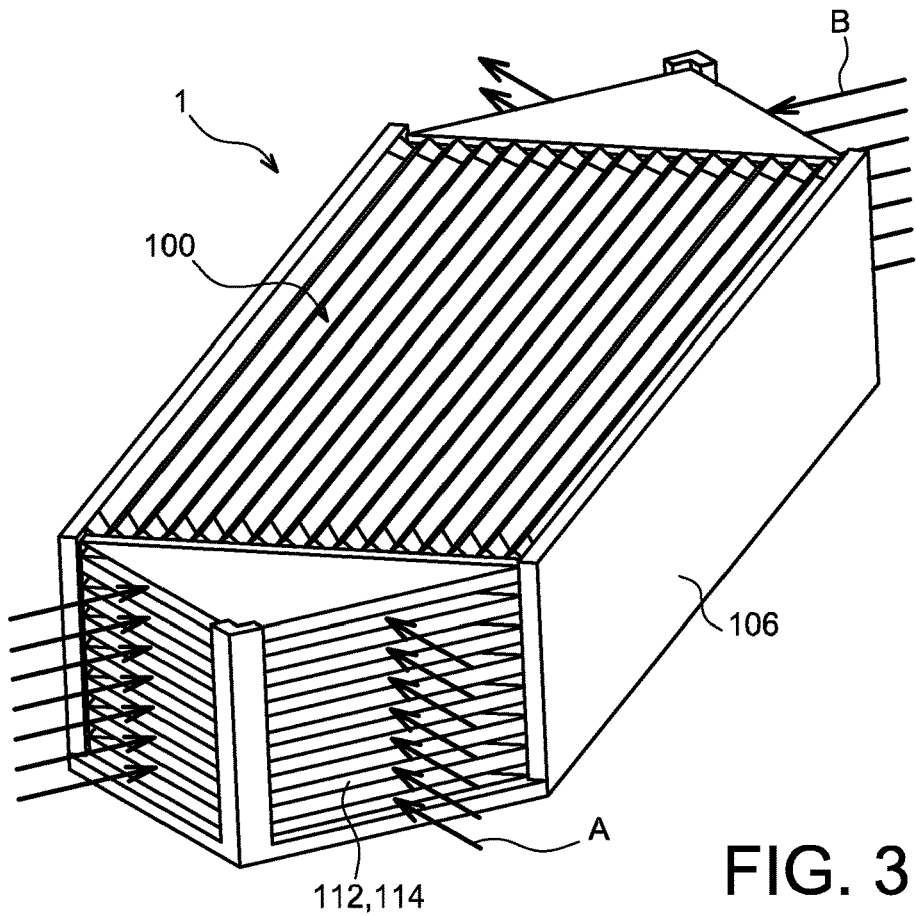
FIG. 3 is a perspective view of the exchanger shown in the preceding figures, without its cover.
Figure 4:
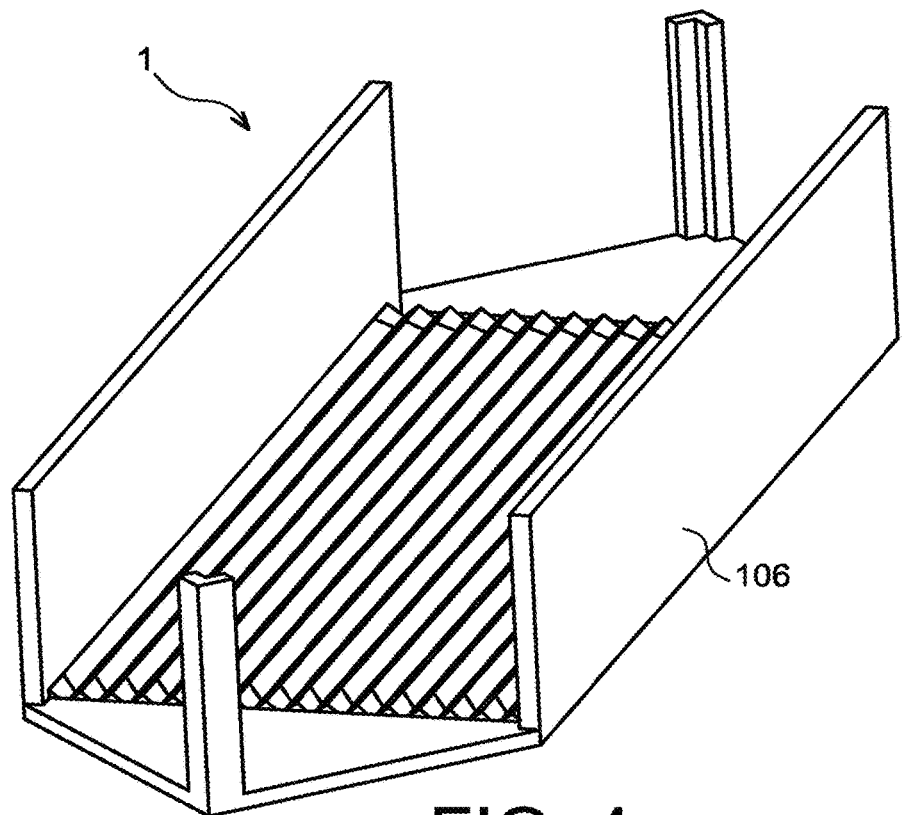
FIG. 4 is a perspective view of the outer casing of the exchanger shown in the preceding figures.
Figure 5:
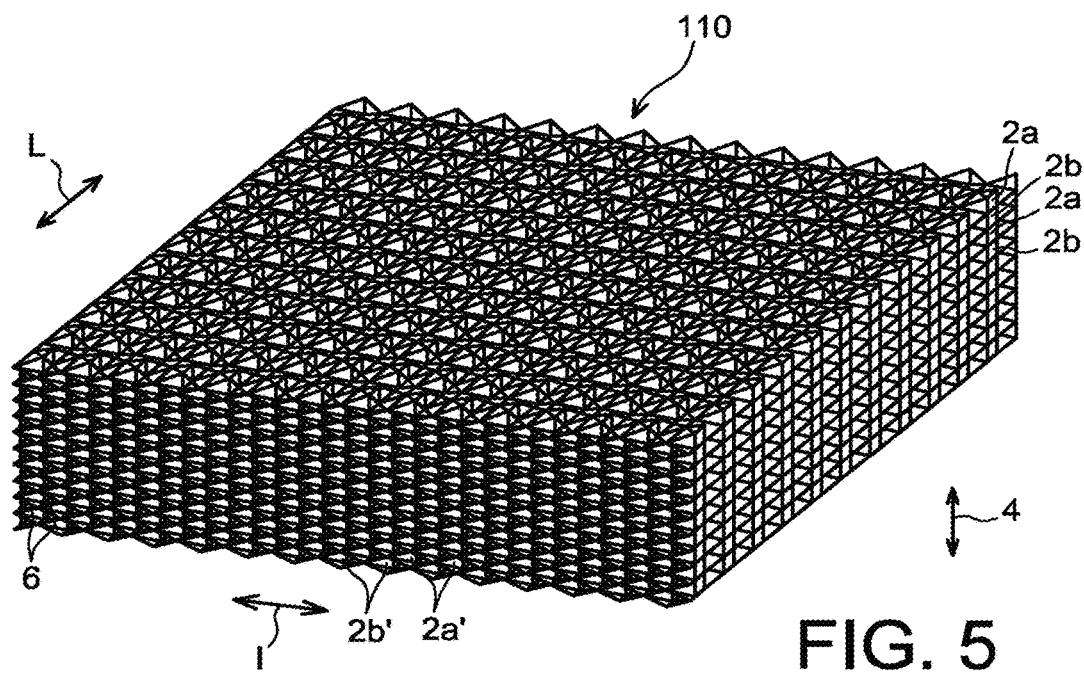
FIG. 5 shows a perspective view of a stacking of membranes and of air circulation networks, with this stacking being received in the casing shown in the preceding figure.

In FIGS. 2 to 4, the exchanger 1 has been shown, which comprises an outer casing 106 closed by a cover 108, with these two elements forming a space wherein the core of the exchanger is received. This core is comprised of a stacking 110 of membranes and of air circulation networks, as shall bed detailed hereinafter. In addition, on either side of the stacking 110, air distributors and collectors cooperating with the networks are provided, in such a way as to ensure the distribution and the collection of the two air flows A and B. The distributors and the collectors, of which details on the design shall be given later, bear the numerical references 112, 114 in FIGS. 2 and 3.

In reference to FIGS. 5 to 8, the design of the stacking 110 forming the core of the exchanger is detailed. This stacking 110 comprises a plurality of first and second air circulation networks 2a, 2b, stacked one on top of the other according to a direction of stacking 4. The networks 2a, 2b are arranged alternately according to the direction 4, and respectively provided for the circulation of the vitiated flow A and the circulation of the incoming fresh flow B, as has been diagrammed by the arrows in FIG. 7A. The exchanger is counter-current, namely the direction of flow of the flows A within the networks 2a is substantially opposite the direction of flow of the flow B within the networks 2b.

Between the directly consecutive networks 2a and 2b in the direction 4, a polymer membrane 6 permeable to water vapour and impermeable to air and to liquid water is provided. It is therefore through these membranes 6 separating the networks two-by-two that the transfer of humidity between the two flows A and B is produced. Such membranes 6 are also referred to as "imper-breathing membranes".

The membranes 6 interposed between the networks 2a, 2b are therefore carried by the latter. As indicated hereinabove, the stacking 110 is inserted into the casing 106 of the exchanger in order to allow for the maintaining thereof, and conventional seals are placed at the periphery of the stacking 110 in order to provide a seal and prohibit communication between the networks 2a and the networks 2b.

In this preferred embodiment, each membrane 6 has a uniform transverse section, defining a broken line of the triangle signal type. In other terms, as a section according to a cutting plane orthogonal to the length "L" of the stacking 110, each membrane 6 has alternately, according to the width "I" of this stacking, hollows and protrusions in the form of a triangle.

Figure 6:
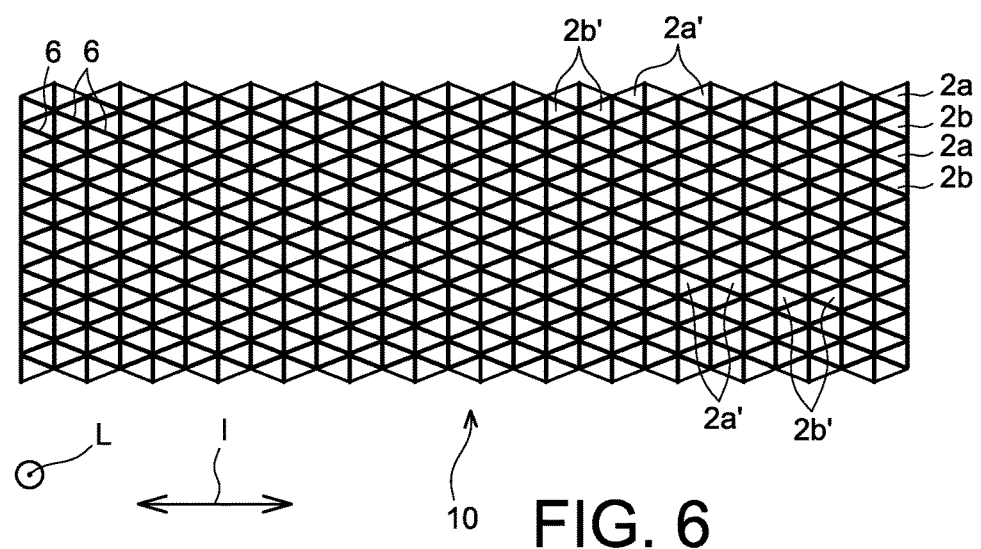
FIG. 6 is a view of the stacking shown in the preceding figure, viewed according to the direction of the length of this stacking.

In addition, two directly consecutive membranes 6 in the stacking are shifted by a half-period according to the width "I", in such a way that the vertices of the triangles are located facing two-by-two according to the direction of stacking 4, as can be seen perfectly in FIG. 6. The vertices here are very close to one another, which leads to the formation of a design of the type as a checkerboard. In this type of design, as a cross-section according to a plane orthogonal to the length "L" of the stacking 110, the stacked membranes 6 define channels in a diamond that, together, form a sort of checkerboard.

More precisely, each first network 2a has channels 2a' in the shape of a diamond, with these channels being arranged end-to-end according to the direction "I", by being connected by their vertices. Similarly, each second network 2b has channels 2b' in the shape of a diamond, with these channels also being arranged end-to-end according to the direction "I", by being connected by their vertices. Once of the advantages of this configuration of the checkerboard type resides in the fact that each channel 2a' is in contact with four channels 2b' on its four sides, of which two channels 2b' belonging to the directly upper network 2b in the stacking, and of which two other channels 2b' belonging to the directly lower network 2b in the stacking. It is obviously the same for any channel 2b', that is in contact with four channels 2a' on its four sides. With this arrangement, the exchange surface is increased, and the compactness is improved. It is moreover noted that a seal between the various channels of the same network is not expressly sought, as air can indeed pass from one to the other by passing through the location where the membranes come very close to one another, namely on their vertices forming the bow ties of the checkerboard.

It is noted that this design of the checkerboard type can also be observed as a view according to the direction "L" such as that of FIG. 6, with the direction "L" also corresponding to the main direction of the flow of air through the networks as well as the direction of the extent of the channels 2a' and 2b'.

The networks 2a, 2b has identical structures, carried out using the same mesh repeated in the plane of each network concerned. As can be seen in the FIGS. 5 to 8, the structures of the networks 2a, 2b consist primarily of cells 12a, 12b, of axes 14a, 14b parallel to the direction of stacking 4. These cells are cylindrical and with a noncircular section, open on either side in the direction of stacking 4. More precisely, each cell 12a, 12b here has a global hexagon shape when it is viewed according to the direction of stacking 4. However, the thickness of the cell according to the direction 4 is not uniform, and this in order to make it possible to adapt to the complex shape in hollows and triangular protrusions of the membranes 6, as shall now be described in reference to FIGS. 9 to 12.

Indeed, these figures show the mesh 16a allowing for the manufacture of the first network 2a. As indicated hereinabove, the mesh is the same for the manufacture of the second network 2b, of identical structure. Also, only the mesh 16a shall be described hereinafter. Moreover, it is noted that in all of the rest of the description, and in the figures, elements bearing numerical references ending with the letter "b" correspond to elements of the mesh of the network 2b, identical to the elements of the mesh of the network 2a bearing the same numerical references, and followed by the letter "a".

The mesh 16a has a plane of symmetry 17a which is orthogonal to the direction 4, and therefore also orthogonal to the axis 14a. This plane of symmetry 17a therefore constitutes a plane of symmetry for the entire network 2a, after repetition of the meshes 16a.

The mesh 16a comprises a cell wall 18a that defines the aforementioned cell 12a. In order to reach the generally hexagon shape, the cell wall 18a comprises six planar faces, parallel to the direction 4. This first of all is two opposite faces 20a arranged substantially parallel to the main direction of circulation of the air through the network concerned, i.e. according to the direction "L" according to which also extend the channel. This then entails two pairs of two faces 22a passed through by air, and therefore being perforated as much as possible, in order to limit the load losses. Of course, the two pairs of faces 22a are connected to one another by the two opposite faces 20a.

The faces 22a are each substantially triangular, connected two-by-two by one of their vertices 24a. As such, for the obtaining of the triangular shape and of the perforated nature, each face 22a has a base that corresponds to the edge of the adjacent face 20, and two straight reinforcements respectively forming the two sides of the triangle converging towards the vertex 24a with the other face 22a of the pair. The two vertices 24a are then located in the plane of symmetry 17a, on the future bow ties of the checkerboard. The armatures make it possible to define openings 26a for the passage of air at the inlet of the cell in the direction "L", and at the outlet of the cell in this same direction.

The cell wall 18a has two opposing edges 30a on which the cell is open in the direction of stacking 4. One of the particularities of the invention resides in structuring these edges, in such a way that they are no longer respectively inscribed in two parallel planes, as in prior art.

More precisely, each edge 30a defines a hollow 32a in the cell wall 18, this hollows being open in the direction 4, in the direction of the directly facing network in the stacking. AS shall be detailed hereinafter, the presence of these hollows 32a allows for the nesting of the first and second networks 2a, 2b, and therefore the obtaining of the checkerboard configuration.

The mesh 16a furthermore comprises a connecting rod 28a that extends protruding from one of the vertices 24a, substantially in the direction "L" and in the plane of symmetry 17a, namely orthogonally to the direction of stacking 4.

Figure 13:
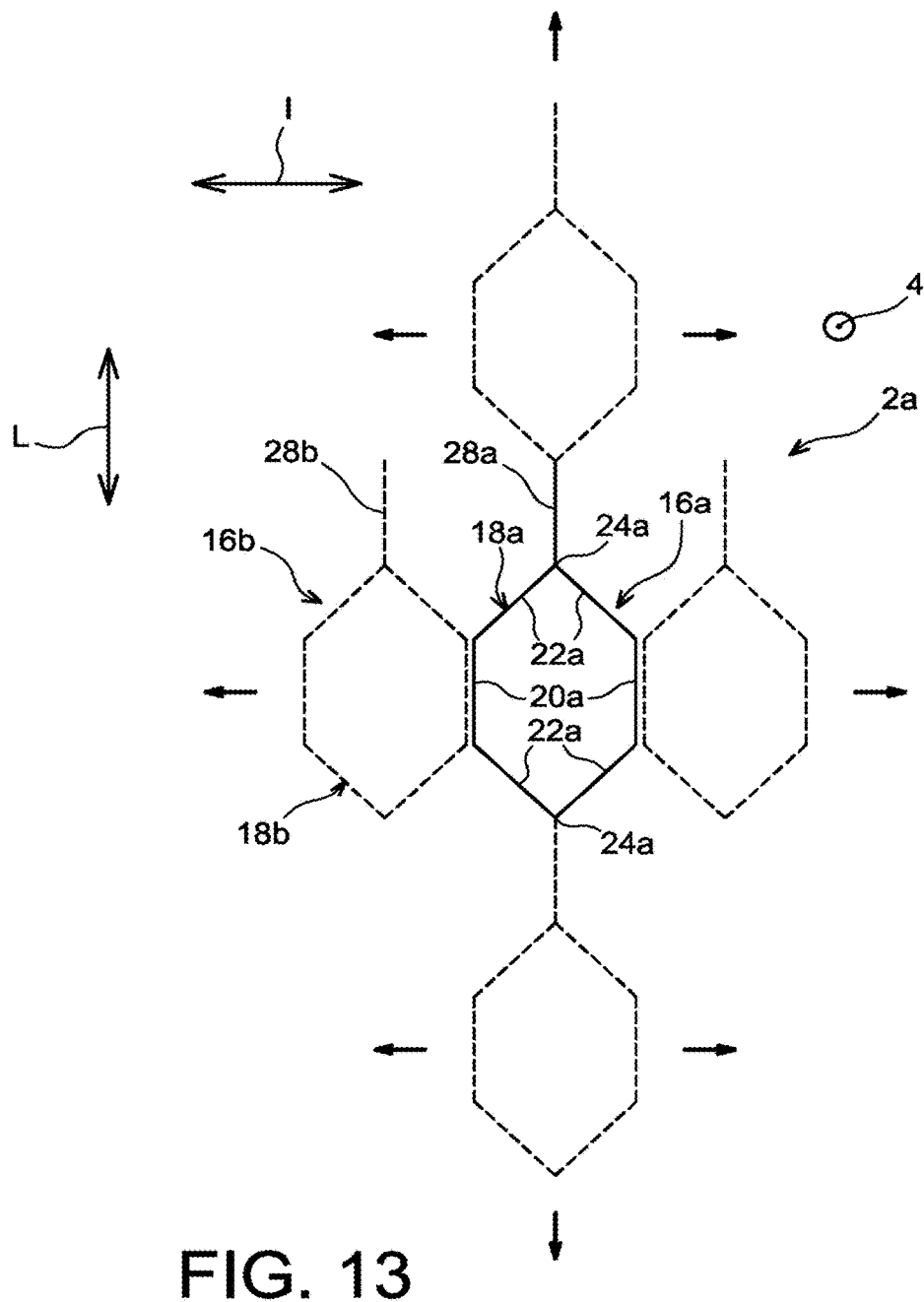
FIG. 13 is a top view showing, diagrammatically, the formation of a network using the mesh shown in the preceding figures.

In reference to FIG. 13, the meshes 16a are repeated as many times as required in order to obtain the network 2a. To do this, in the direction "I", each face 20a of a cell wall 18a is superimposed on a face 20a of an adjacent mesh. On the other hand, in the other direction "L", the end of the connecting rod 28a is connected to the adjacent mesh, on the vertex 24a devoid of a rod.

Furthermore, for the manufacture of the networks 2a, 2b, it is noted that the materials considered are the polymer and metal materials, while the membranes 6 are preferentially made from a polymer material or from paper.

For the manufacture of the networks 2a, 2b, the machining technique, although possible, is not preferred. Two other manufacturing techniques are favoured. In the two cases, options of partitioning the final network can be considered, especially if its dimensions are substantial.

The first technique is the injection technique, more preferably plastic injection. In light of the geometric complexity of the air circulation networks, the partitioning can be carried out on the one hand in the directions "L" and "l", but also especially in the direction of the height, corresponding to the direction 4. As such, a complete network can be an assembly of several parts, for example by mechanical fastening, or by heat welding.

Metal injection, in particular the injection of aluminium, can also be considered, for example using a sand mould. Here also, a partitioning is preferred for the obtaining of the final network, forming a separator between two directly consecutive membranes in the stacking.

The other favoured technique is that of so called additive manufacturing, or 3D printing. It indifferently applies for the obtaining of a metal network or in a polymer material. Here also, a partitioning can be considered, before reaching a final network. For the purposes of information, this may be a method of 3D printing of parts or assemblies of parts directly in imper-breathable polymer materials, wherein the membrane and the air circulation network would form only one part.

Figure 7:
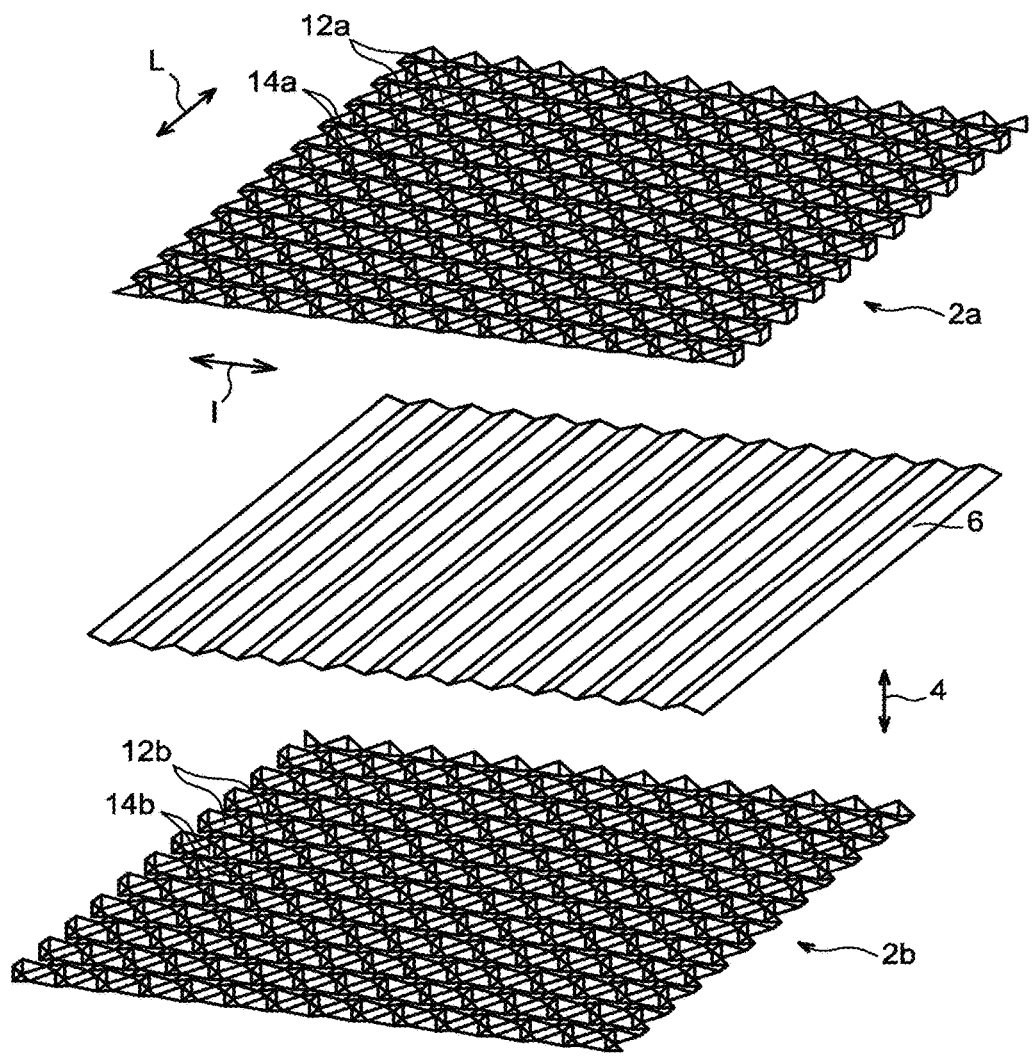
FIG. 7 shows an exploded view in perspective of an assembly comprising a first and a second air circulation network, between which is arranged a membrane.
Figure 7A:
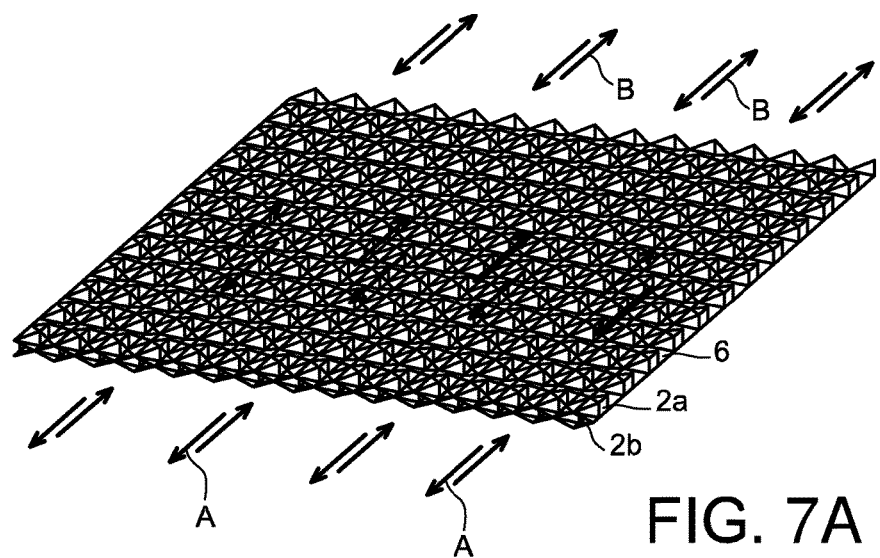
FIG. 7A is a perspective view of the assembly shown in the preceding figure.
Figure 8:
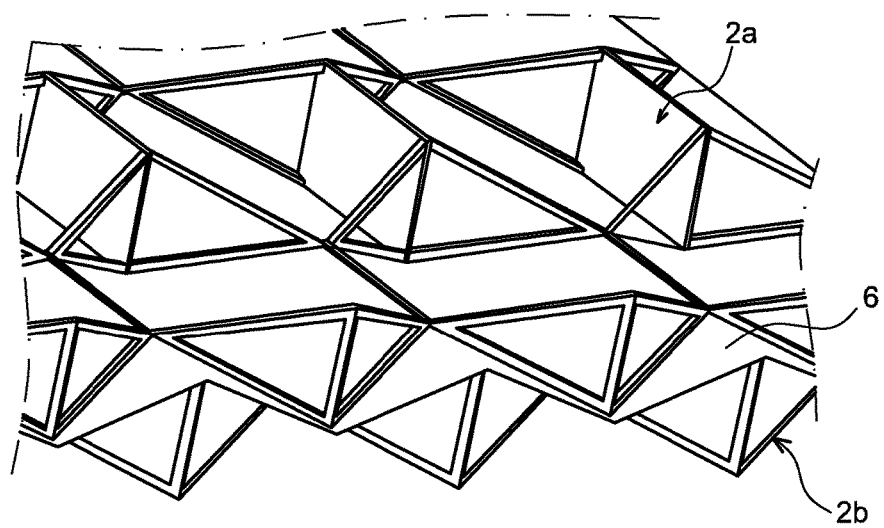
FIG. 8 is a more detailed perspective view of a part of the assembly shown in the preceding figure.
Figure 9:
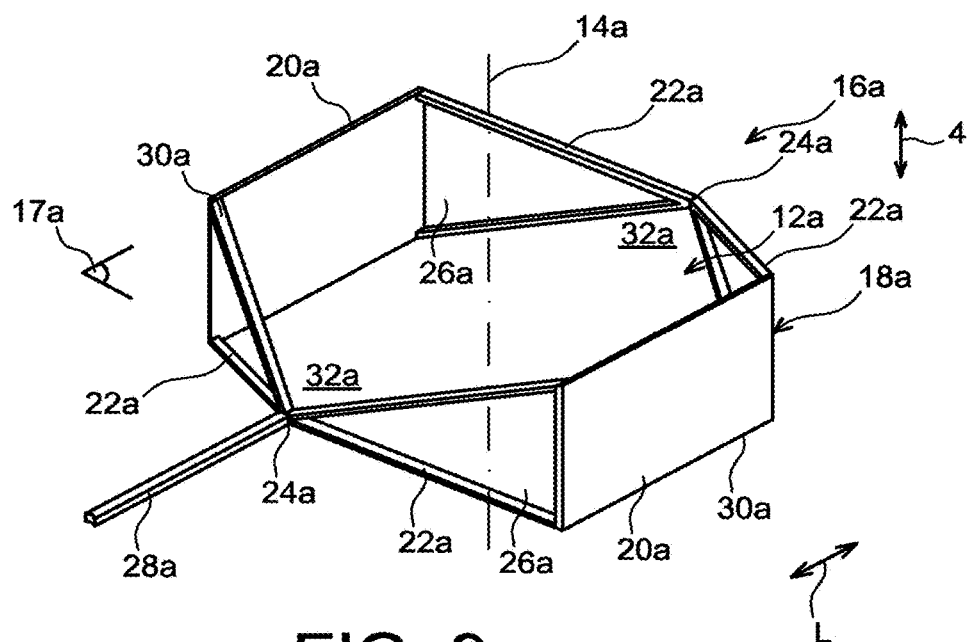
FIG. 9 is a perspective view of a mesh for the formation of the air circulation networks shown in the preceding figures.
Figure 10:
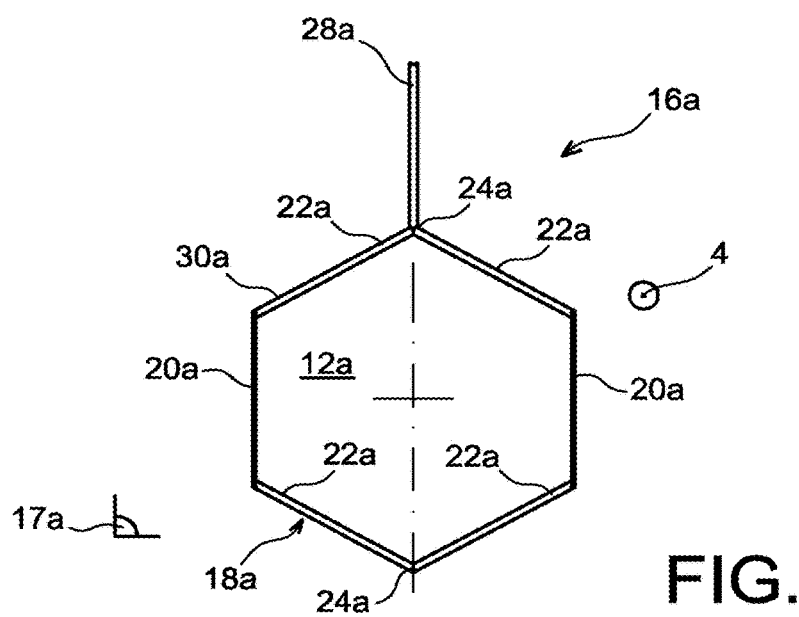
FIGS. 10 to 12 show the mesh of the preceding figure in different views.
Figure 11:
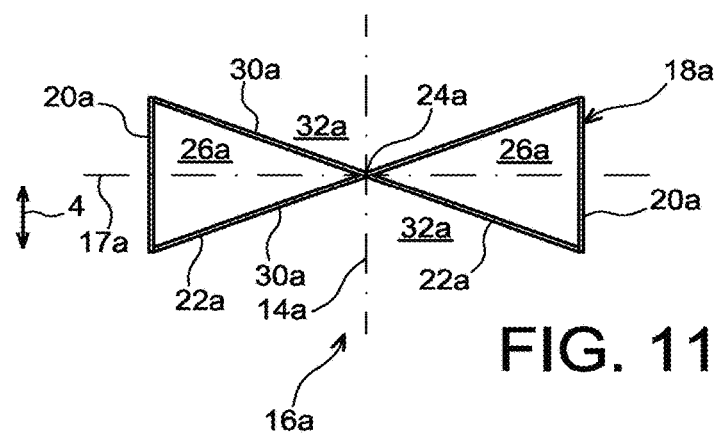
Figure 12:
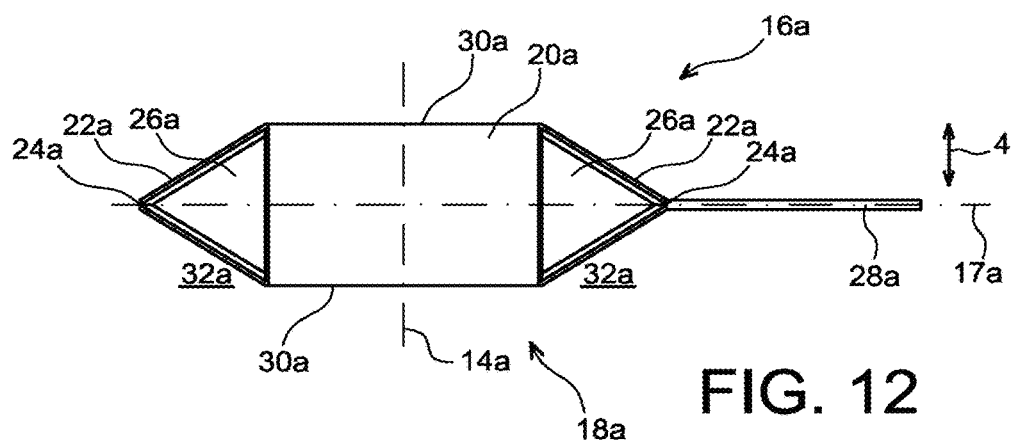
Figure 14:
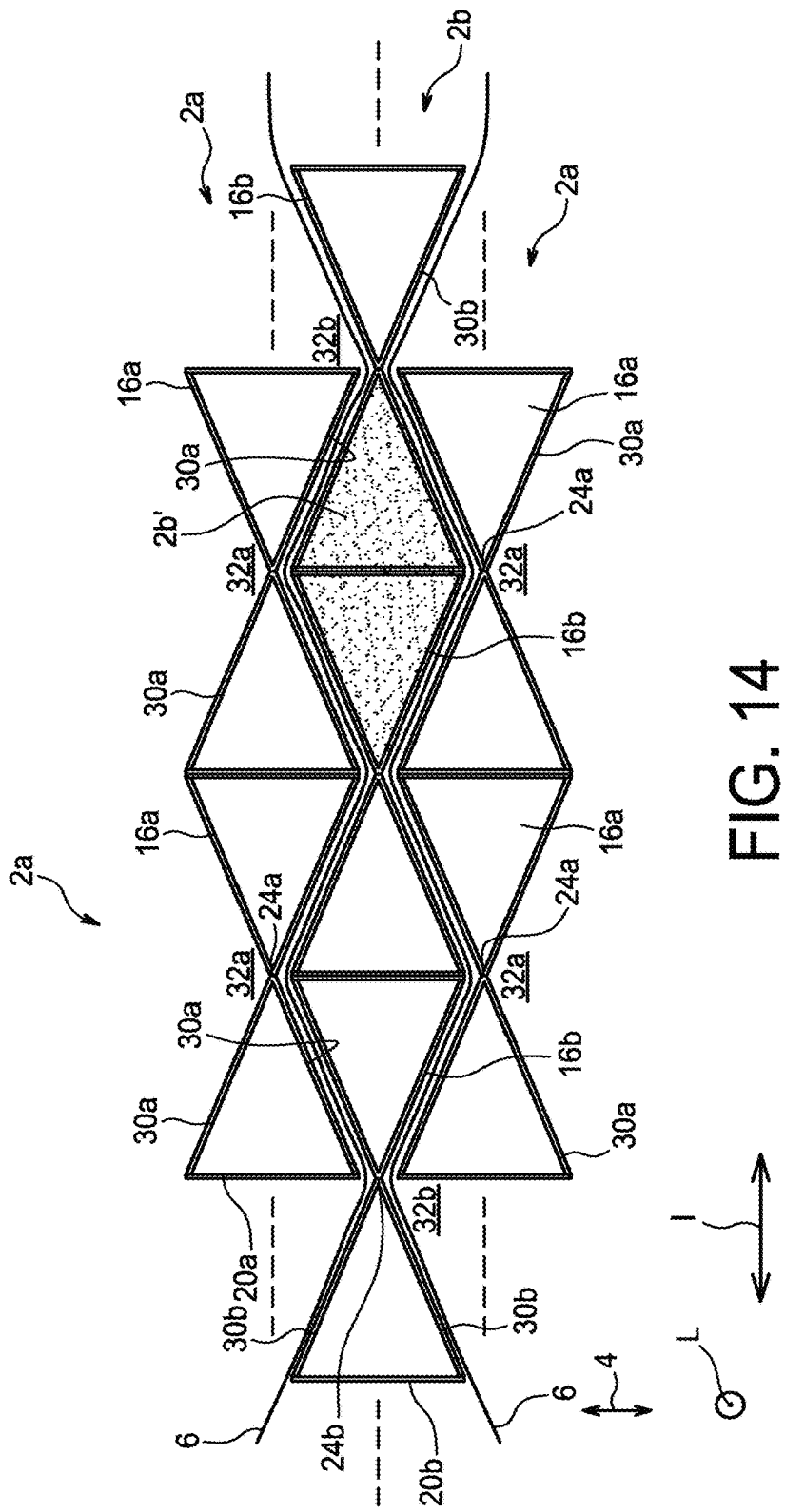
FIGS. 14 and 15 show in more detail the cooperation between the various air circulation networks, respectively as a front view and as a top view.
Figure 15:
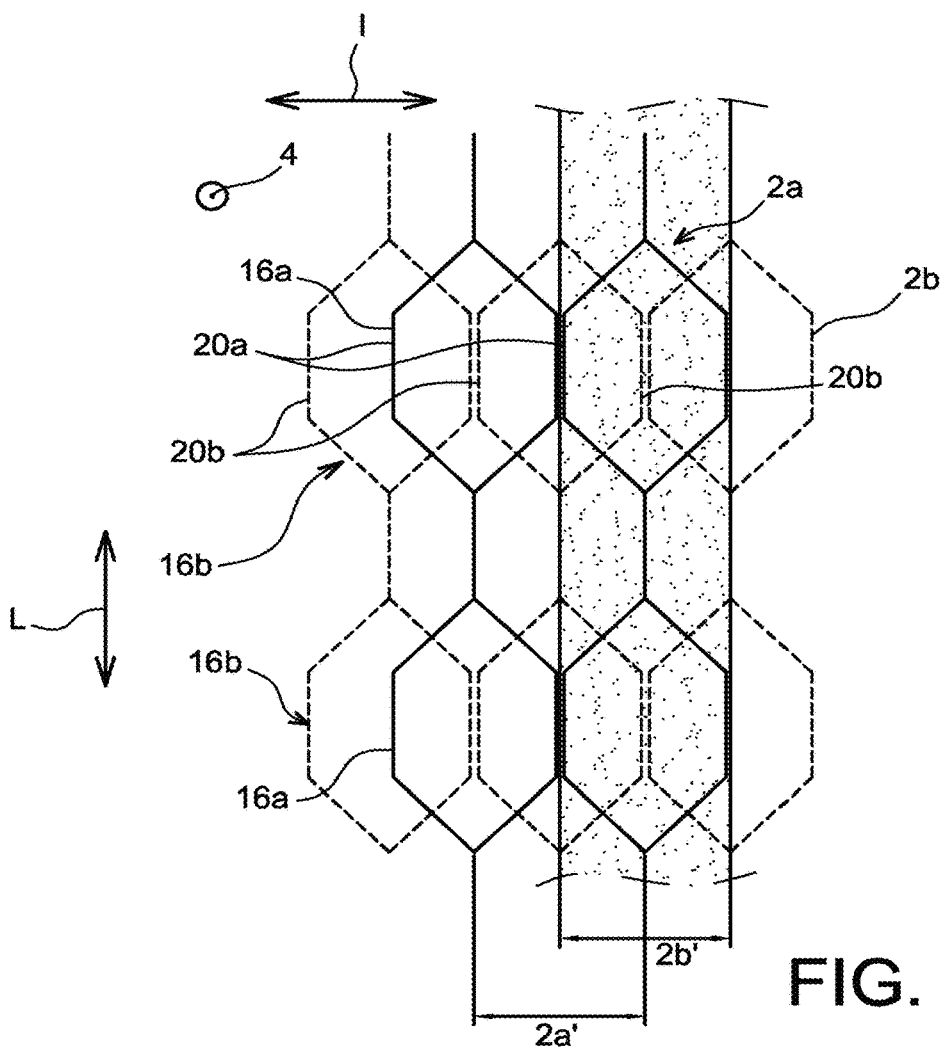

In reference to FIGS. 14 and 15, when the membranes 6 and the networks 2a, 2b are obtained, they are stacked according to the direction 4. As mentioned hereinabove, this stacking is carried out in such a way that the networks 2a, 2b are nested one inside the other, thanks to the presence of hollows 32a at the ends of the cell walls. For two directly consecutive networks 2a, 2b, the desired nesting is obtained by shifting the two identical structures by a half-pitch of mesh according to the direction of the width "l". By taking into account on the one hand that the structure of the two networks 2a, 2b has the same width according to the direction "l", and on the other hand that as is shown in FIG. 7, each one of them has a lateral end comprised of whole meshes, as well as an opposite lateral end comprised of half-meshes, the desired shift can be obtained easily by placing the first network 2a in the one direction and the second network 2b in the other direction. In other words, it is sufficient to simply turn over one network out of two in the stacking, in order to obtain the desired shift between each stage in this stacking.

By proceeding as such, on the edges 30a of the meshes 16a of the first network, the hollows 32a are filled in for a large part by the meshes 16b of the adjacent network 2b. More precisely, each hollow 32a of a first network 2a receives two wall-halves of two adjacent cells of the second network 2b, with these two wall-halves being also received, oppositely, by the hollows 32a belonging to the following network 2a in the stacking. The same applies for each hollow 32b of a second network 2b which received two wall-halves of two adjacent cells of the first network 2a, with these two wall-halves also being received, oppositely, by the hollow 32b belonging to the following network 2b in the stacking.

It stems from this that each channel 2b' of the network 2b, of which one is greyed in FIGS. 14 and 15, is delimited between two series of hollows 32a open in the direction of one another, and of which the mechanical resistance is provided by two adjacent half-meshes 16b according to the direction "l". Each channel 2b' is therefore globally delimited laterally by the vertices 24b of two directly consecutive meshes 16b, and delimited in the direction of the height by the vertices 24a of two meshes 16a located one on top of the other in the stacking. With this arrangement, the shape of the channel 2b' as a diamond is therefore found again, of which the four corners respectively correspond to the four aforementioned vertices 24b, 24b, 24a, 24a. Of course, a similar geometry is also observed for each channel 2a' of the first air circulation network 2a.

On the other hand, it is noted that no shift is carried out according to the direction "L" between two directly consecutive networks 2a, 2b, such as can be seen better in FIG. 15. The faces 20a are therefore aligned with one another according to the direction 4, and spaced from one another according to the direction "L" in each channel 2a'. The same applies for the faces 20b aligned with one another according to the direction 4, and spaced apart from one another according to the direction "L" in each channel 2b'. The upstream edge of each one of these faces 20a, 20b, parallel to the direction of circulation of the air in the channels, causes a recirculation of fluid that optimises the convective exchanges between the air flow and the membranes.

Figure 16A:
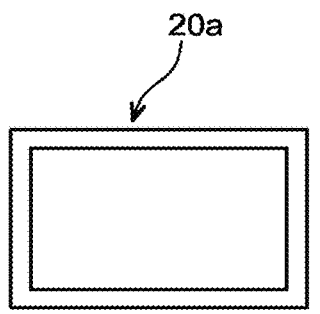
FIGS. 16a to 16c show possible geometries for certain faces of the wall of the cells forming the air circulation networks.
Figure 16B:
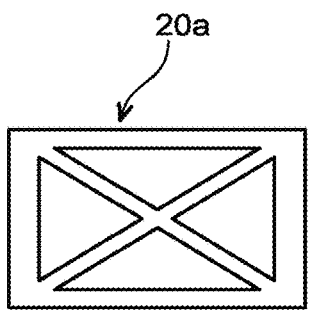
Figure 16C:
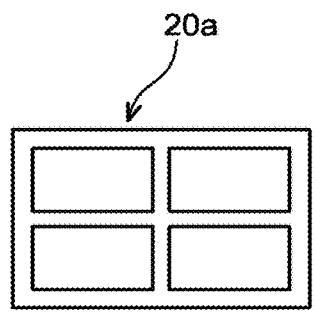

Multiple arrangements of shapes are possible with the elements described hereinabove. This can for example be faces 20a of which three alternative embodiments have been shown in FIGS. 16a to 16c. In these embodiments, the faces 20a are no longer solid, but have been perforated in order to limit the load losses. In FIG. 16a, the central hole is delimited by a frame forming the face 20a. In FIGS. 16b and 16c, the frame is equipped with an inner mechanical reinforcement, in the shape of a cross, in order to improve the mechanical resistance of the network supporting the adjacent membranes.

Identical or similar solutions are also possible for the faces 20b of the cell walls of the second networks 2b.

Figure 17:
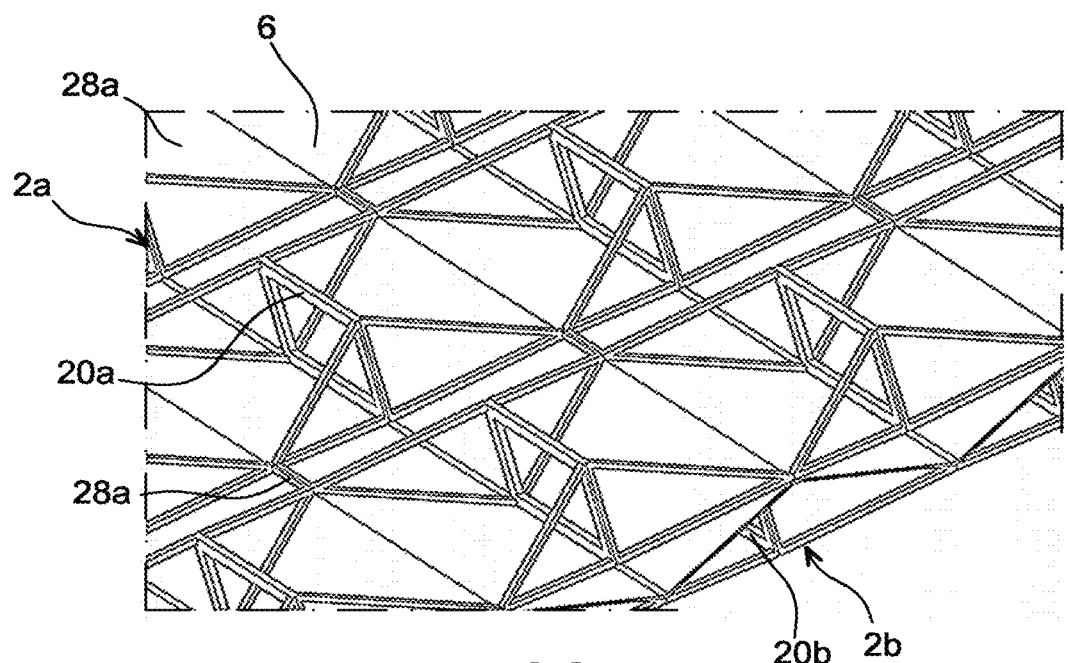
Figure 18:
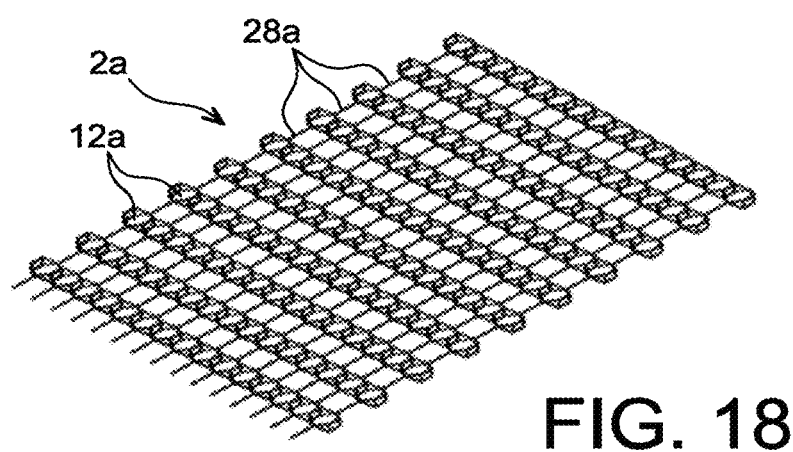
FIG. 18 shows a perspective view of one of the air circulation networks, with a mesh provided with a connecting rod of a dimension that is longer compared to that shown in the preceding figures.

An assembly of two networks 2a, 2b, integrating perforated faces 20a, 20b as in FIG. 16a, was shown in FIG. 17. In this assembly, a reduced length of the connecting rods 28a is also provided. This rod length is indeed adjustable according to the needs encountered, and can therefore also be increased if needed, as has been shown on the network 2a of FIG. 18.

Figure 19A:
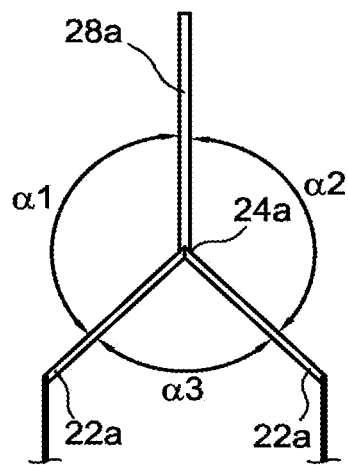
FIGS. 19a to 19c show different possible embodiments for the cell wall.
Figure 19B:
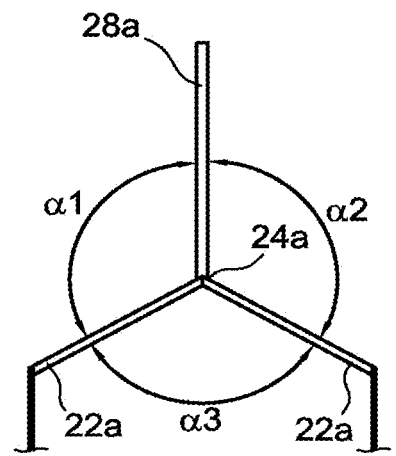
Figure 19C:
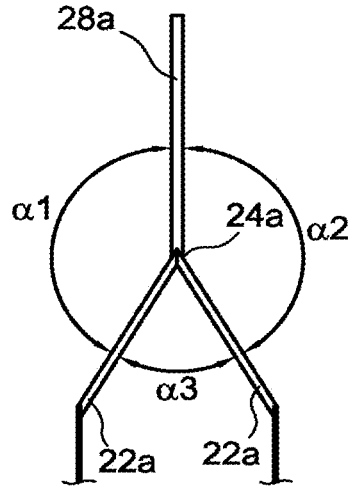
Figure 20:
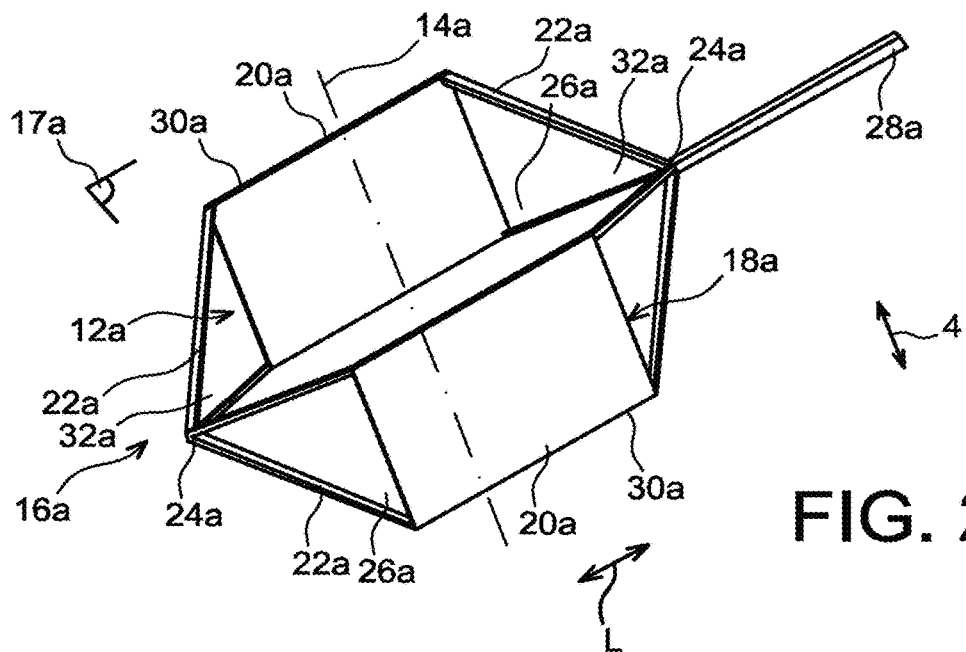
FIG. 20 is a perspective view of a mesh for the formation of air circulation networks, with the mesh presented in the form of another preferred embodiment.
Figure 21:
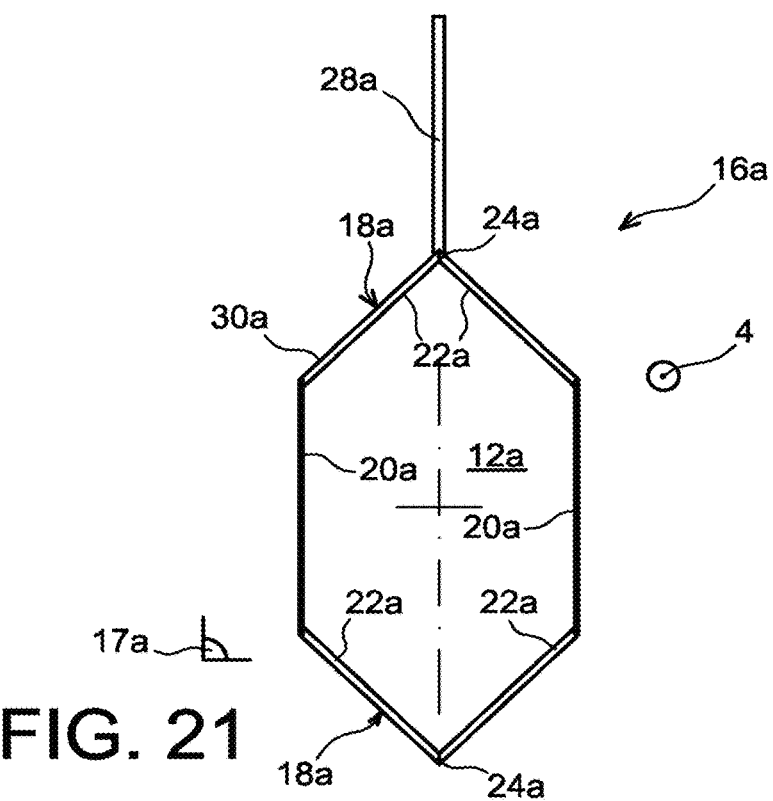
FIGS. 21 to 23 show the mesh of the preceding figure in different views.
Figure 22:
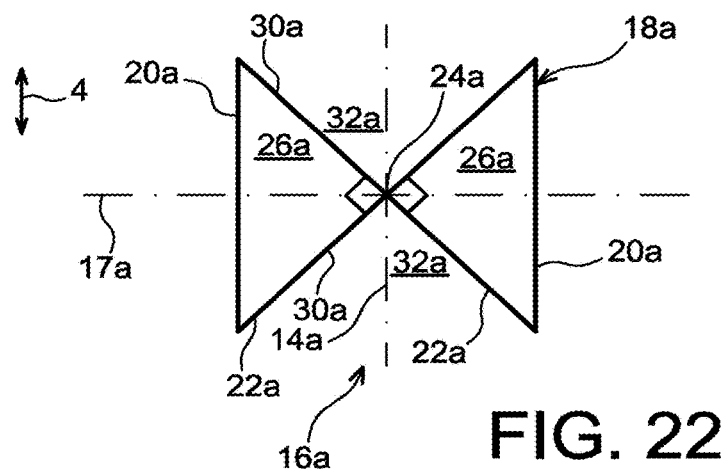
Figure 23:
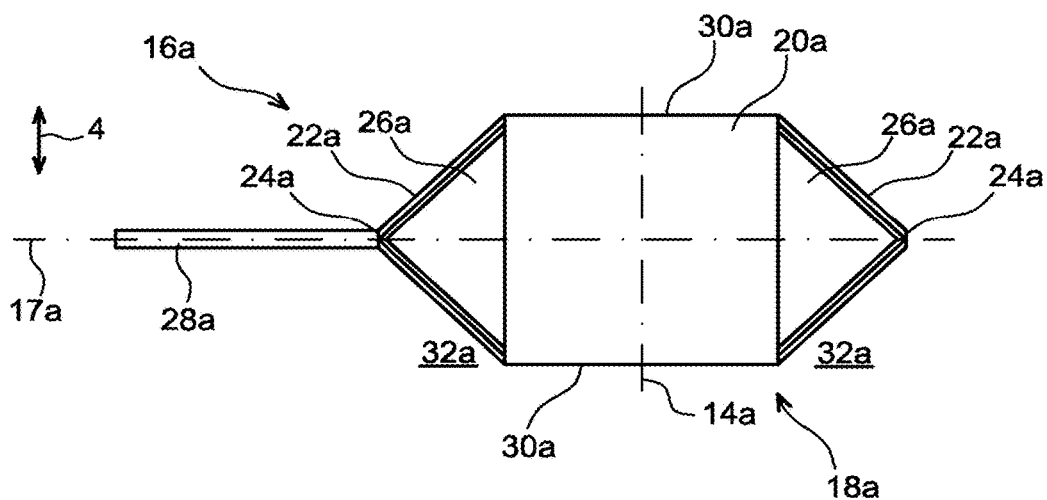
Figure 24:
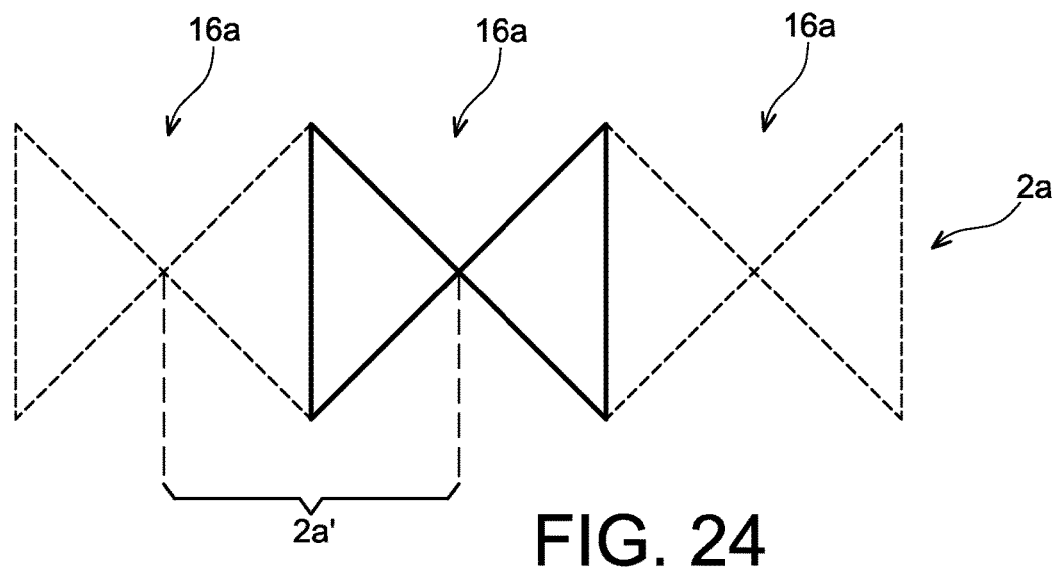
FIG. 24 shows a front diagrammatical view of several adjacent meshes of the same fluid circulation network.
Figure 25:
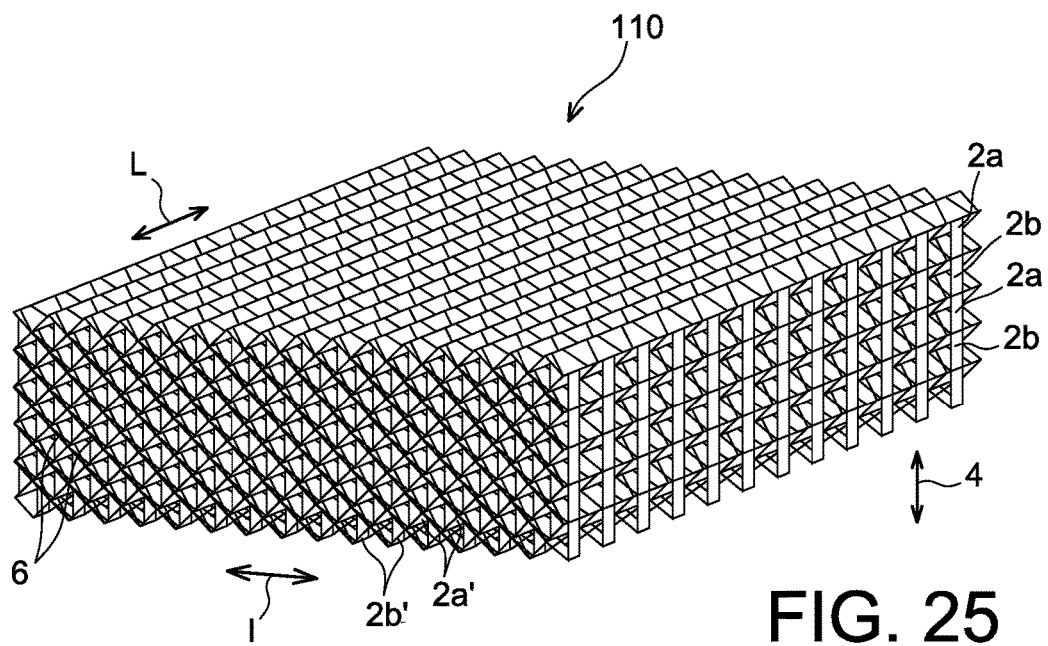
FIG. 25 shows a perspective view of a stacking of membranes and of air circulation networks, with this stacking being carried out using networks such as the one shown in FIG. 24.

FIGS. 19a to 19c also show different possible viewing angles according to the direction 4, on the vertex 24a that provides the connection between the rod 28a and the pair of faces 22a. The angle α1 and the angle α2 are preferably always identical, while the angle α3 between the two faces 22a of the pair can vary. On the first solution of FIG. 19a, leading to a perfect hexagon shape as viewed from the direction of stacking 4, the angles α1, α2 and α3 are equal. However, as shown in FIG. 19b, the angle α3 can be greater than the angles α1, α2, in the same way as the angle α3 can be less than these same angles α1, α2, as has been shown in FIG. 19c.

In reference to FIGS. 20 to 26, another preferred embodiment of the invention is shown, wherein the air circulation networks 2a, 2b are obtained using a different mesh. The mesh 16a differs from that described hereinabove by the shape of the pairs of faces 22a. Indeed, when viewed in the direction of the length "L", the perforated faces 22a each have the shape of a right-angled isosceles triangle, with the right angle located at the connection vertex 24a.

Figure 26:
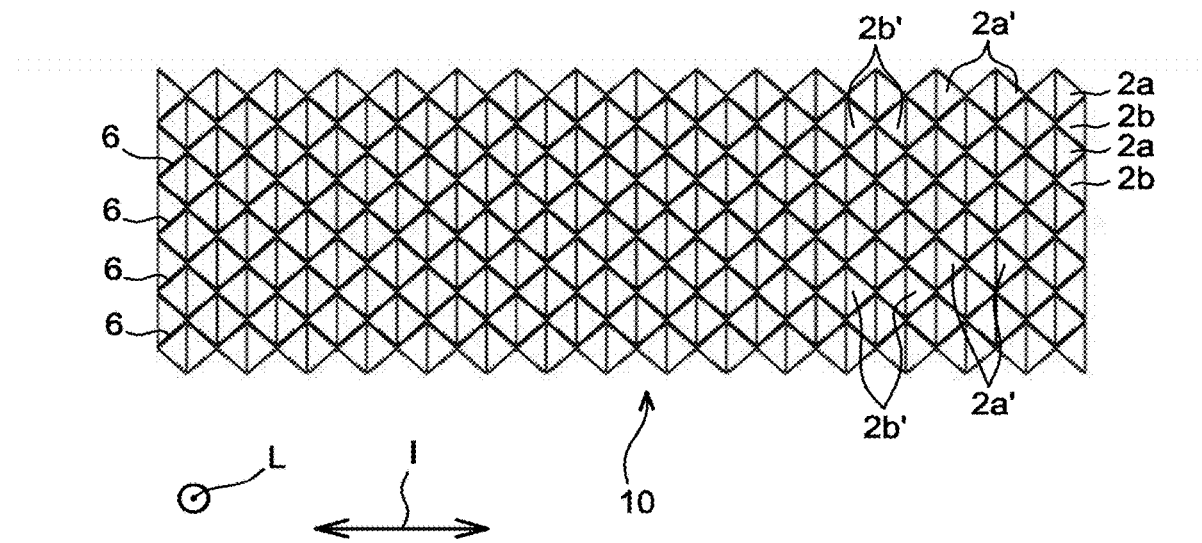
FIG. 26 is a view of the stacking shown in the preceding figure, viewed according to the direction of the length of this stacking.
Figure 27:
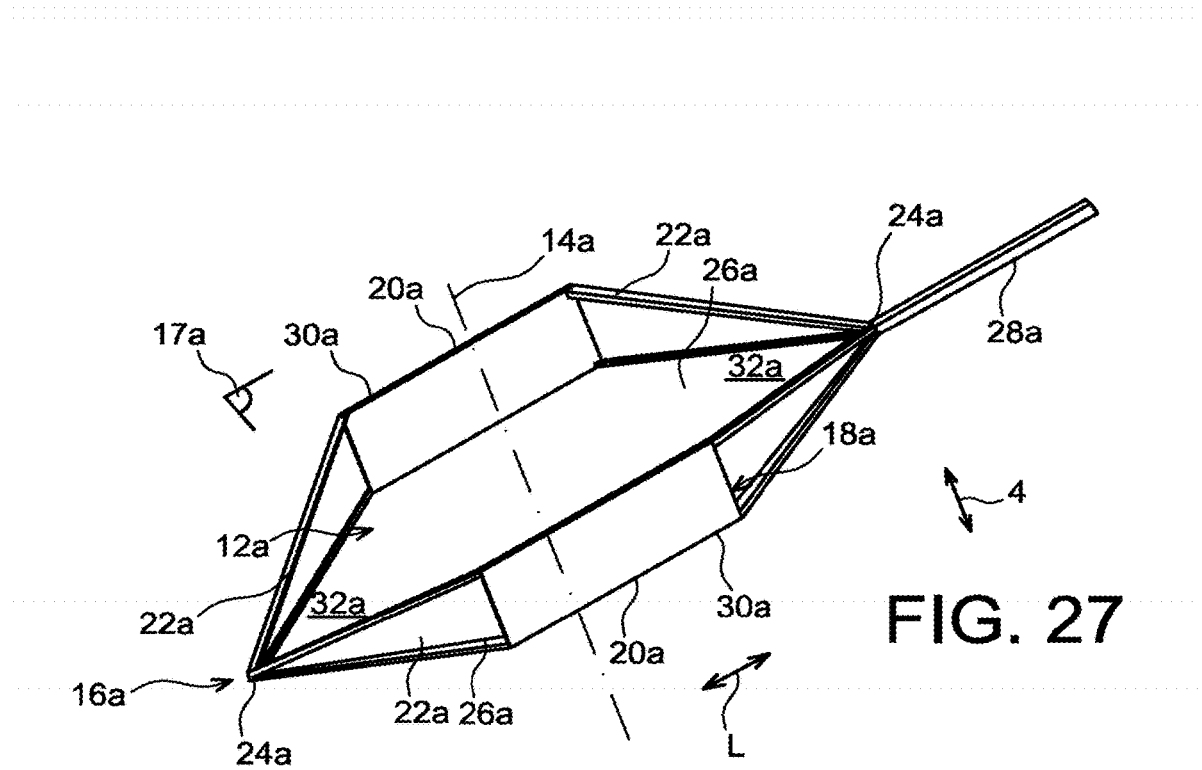
FIG. 27 is a perspective view of a mesh for the formation of air circulation networks, with the mesh presented in the form of another preferred embodiment.
Figure 28:
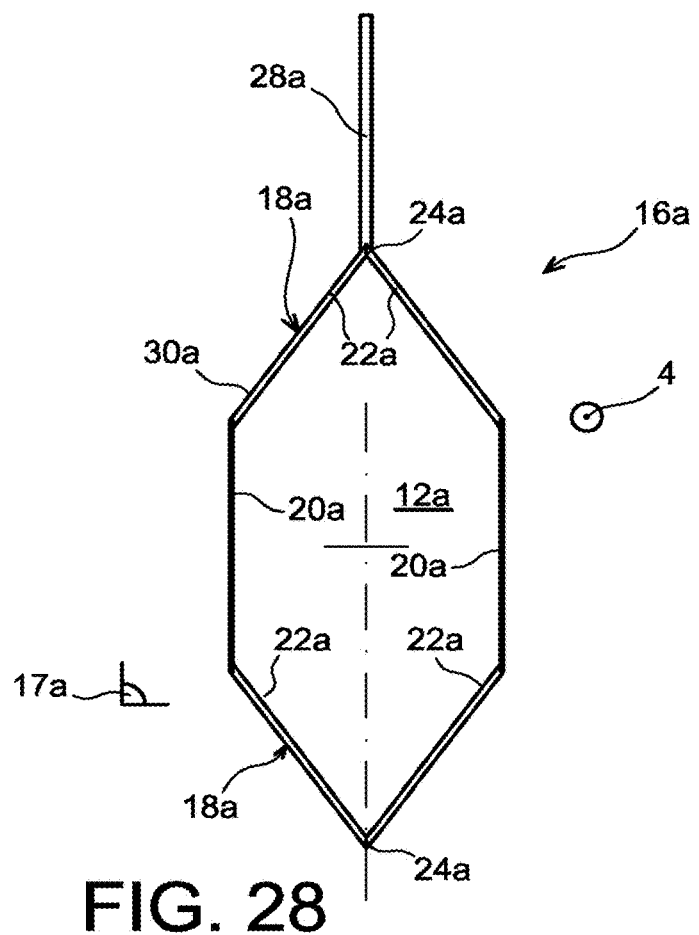
FIGS. 28 to 30 show the mesh of the preceding figure in different views.
Figure 29:
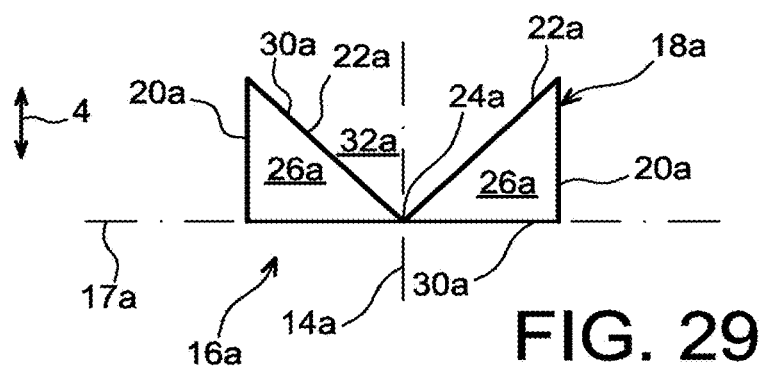
Figure 30:
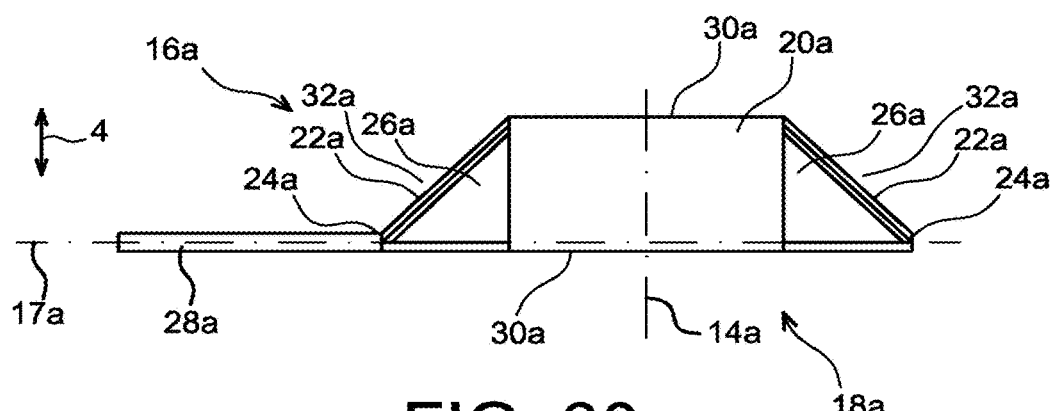

As such, when the meshes 16a are arranged in an adjacent manner according to the direction "l", two directly consecutive half-meshes 16a form a channel 2a' with a square section. This results in a global shape of a checkerboard for the channels 2a', 2b', as can be seen in FIG. 26.

In reference to FIGS. 27 to 33, yet another preferred embodiment is shown, wherein the air circulation networks 2a, 2b are obtained using a different mesh. The mesh 16a differs from that described hereinabove through the shape of the pairs of faces 22a. Indeed, when view in the direction of the length "L", the triangular faces 22a have a lower side that is located in the plane of the lower edges of the opposite faces 20a. The vertex 24a that connects these two faces are also arranged on this same plane, implying that the mesh 16a no longer has a plane of symmetry orthogonal to the direction 4. This also implies that each network is structured solely on one of its lower or upper surfaces, but is no longer structured on its two opposite surfaces. In other terms, the hollows 32a are only present in the upper part of the mesh, but no longer in the lower part.

Figure 31:
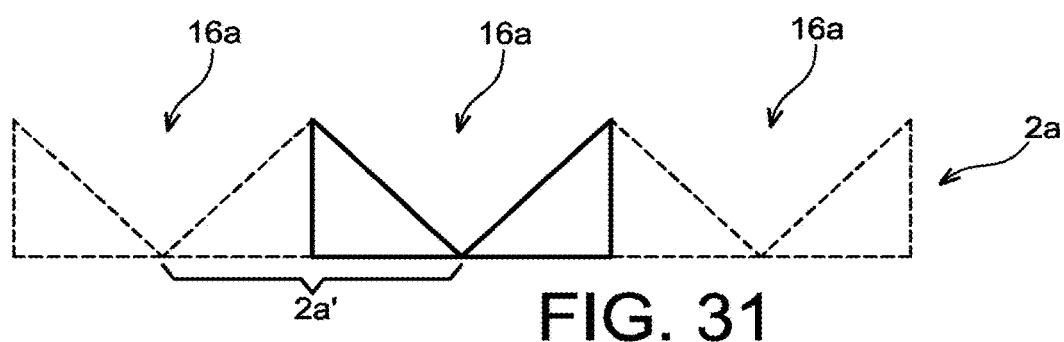
FIG. 31 shows a front diagrammatical view of several adjacent meshes of the same fluid circulation network.
Figure 32:
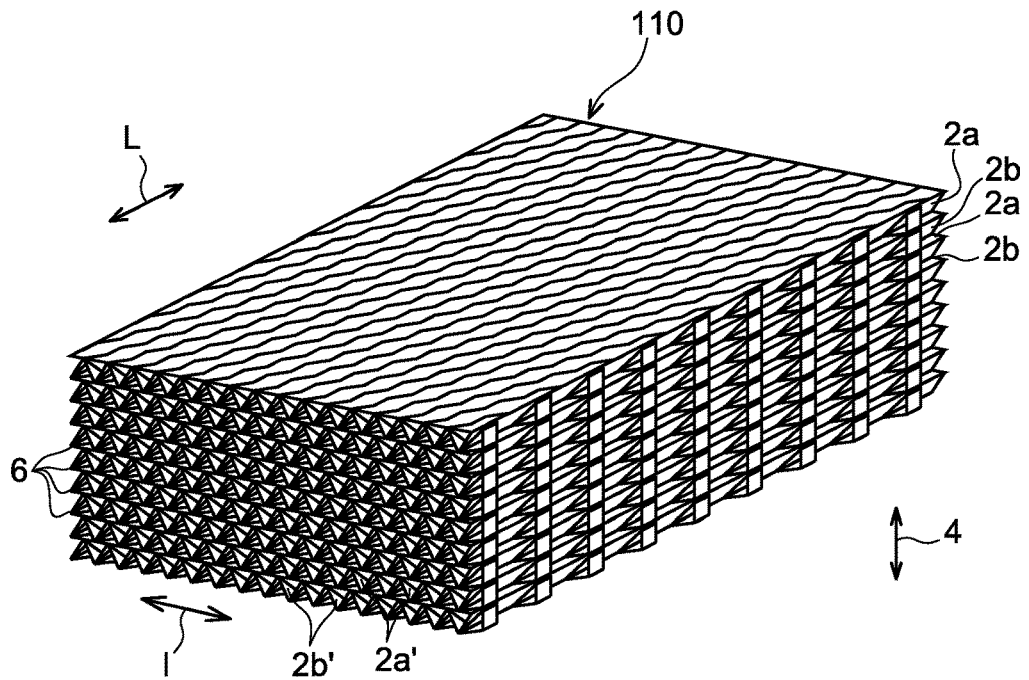
FIG. 32 shows a perspective view of a stacking of membranes and of air circulation networks, with this stacking being carried out using networks such as the one shown in FIG. 31.
Figure 33:
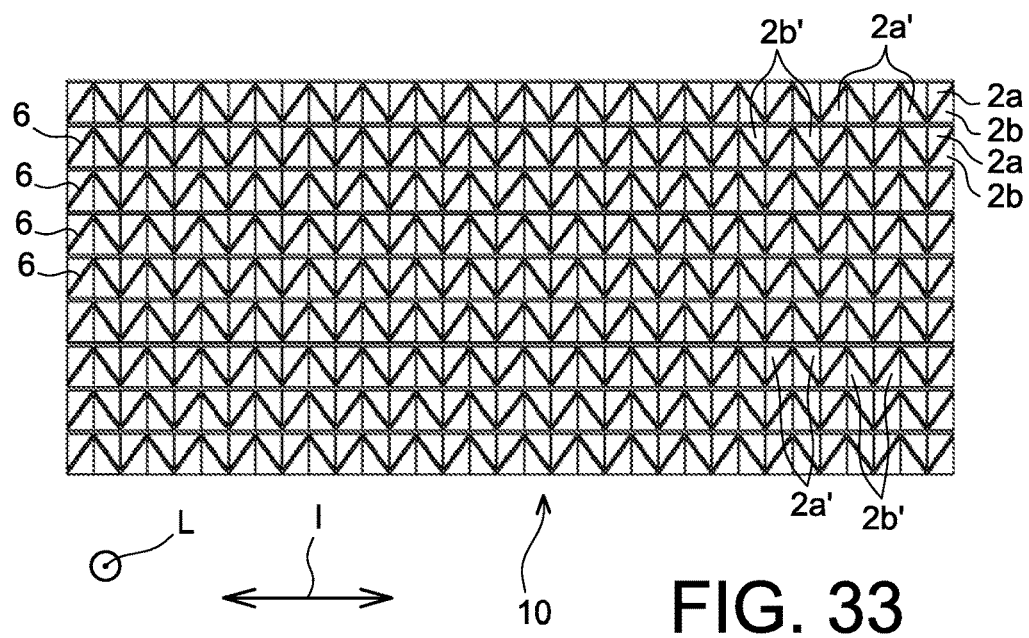
FIG. 33 is a view of the stacking shown in the preceding figure, viewed according to the direction of the length of this stacking.
Figure 34:
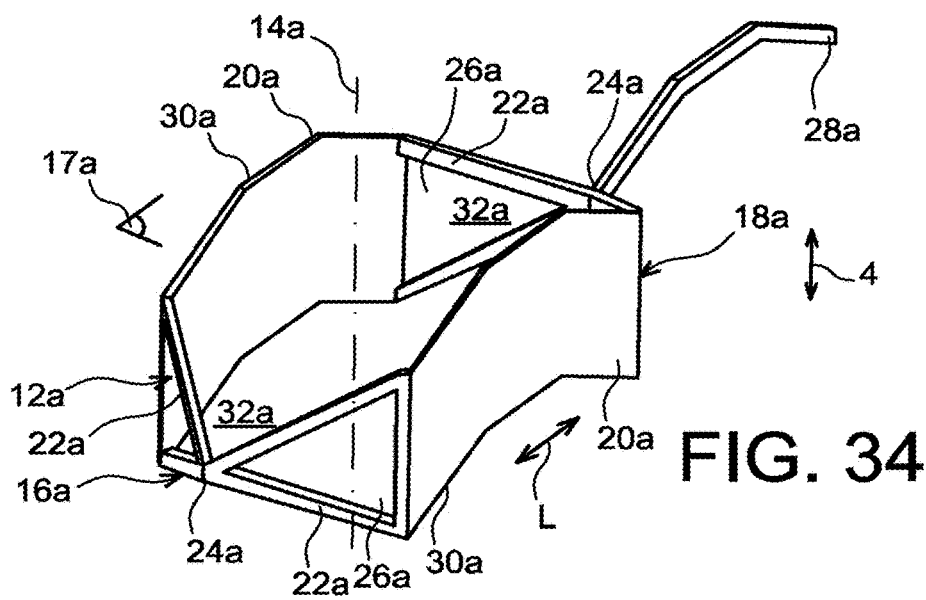
FIG. 34 is a perspective view of a mesh for the formation of the air circulation networks, the mesh being presented according to yet another preferred embodiment.
Figure 35:
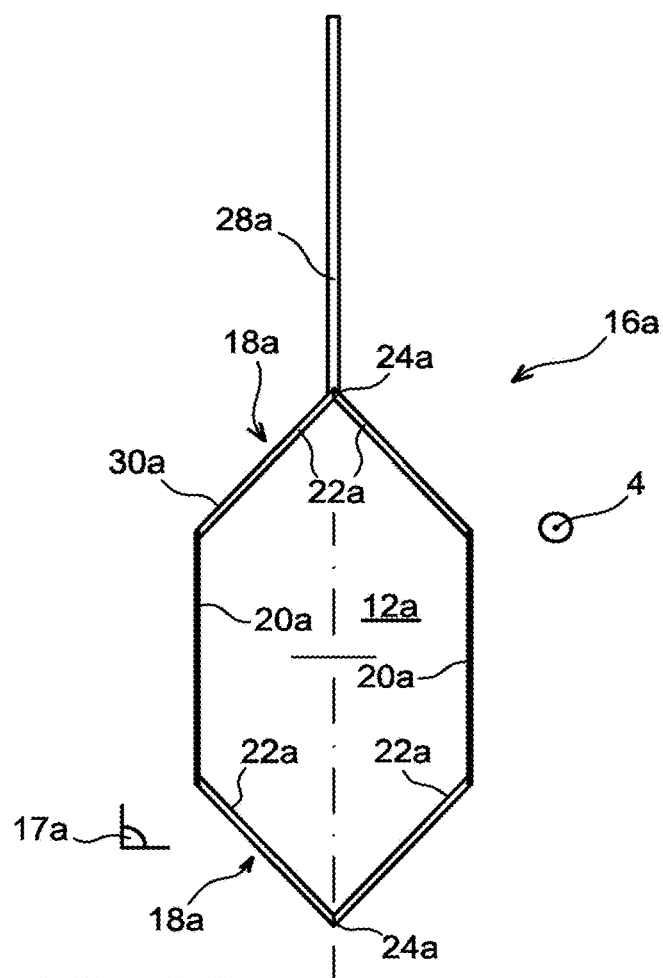
FIGS. 35 to 37 show the mesh of the preceding figure in various views.
Figure 36:
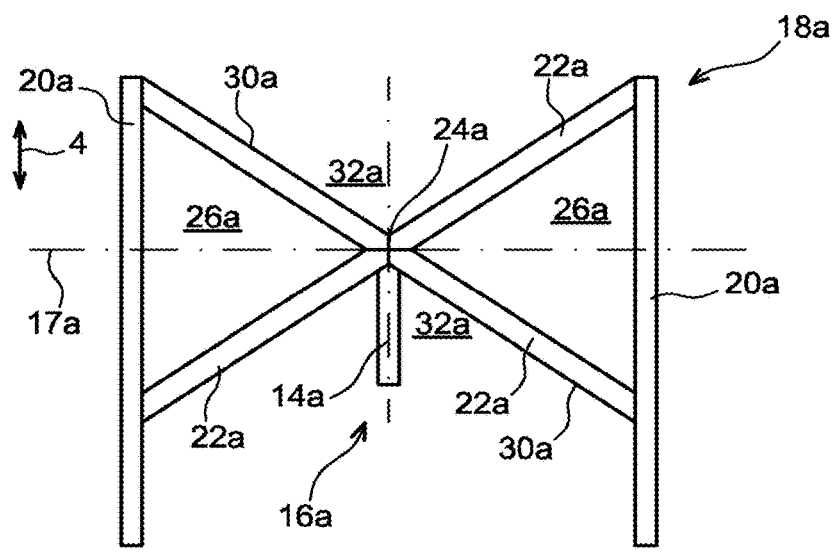

With this configuration, it is arranged in such a way that when the meshes 16a are arranged in an adjacent manner according to the direction "T", two directly consecutive half-meshes 16a form a channel 2a' with a triangular section, more precisely in the shape of an equilateral triangle, as is shown in FIG. 31. This no longer results in a global checkerboard shape for the channels 2a', 2b', but rather in a staggered arrangement of the channels 2a', 2b' of two directly consecutive networks 2a, 2b, as can be seen in FIG. 33. In this case, the nesting of the networks is almost total, and it is therefore carried out two-by-two. This means that between each pair of nested networks, the membrane 6 remains flat.

FIGS. 34 to 38 further shows another embodiment, wherein the air circulation networks 2a, 2b are obtained using a different mesh, that makes it possible to obtain undulated channels 2a', 2b' according to the direction "L". The channels are therefore no longer straight according to this last direction as in the embodiments hereinabove, but undulated in such a way as to further increase the exchange surfaces. Naturally, the membranes 6 arranged between the networks 2a, 2b also have such an undulation, in the direction of stacking 4.

Figure 37:
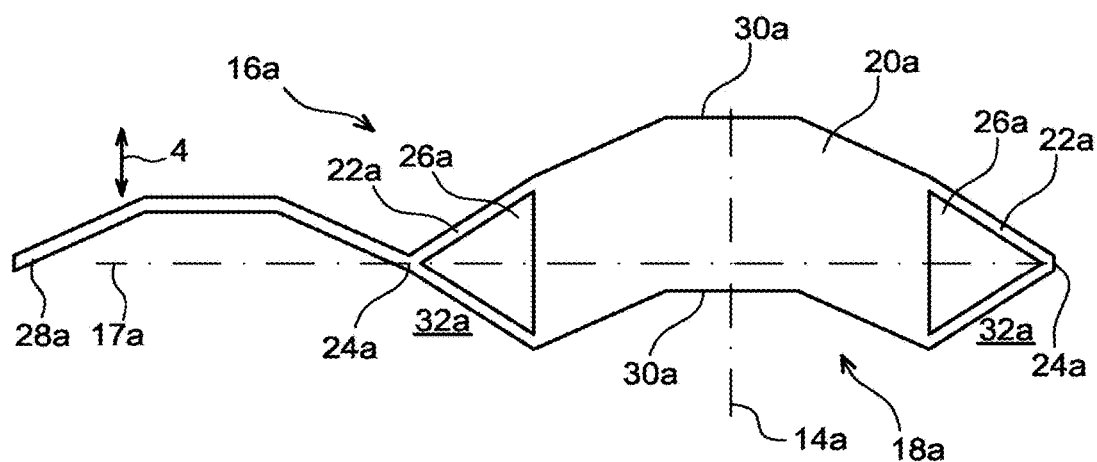
Figure 38:
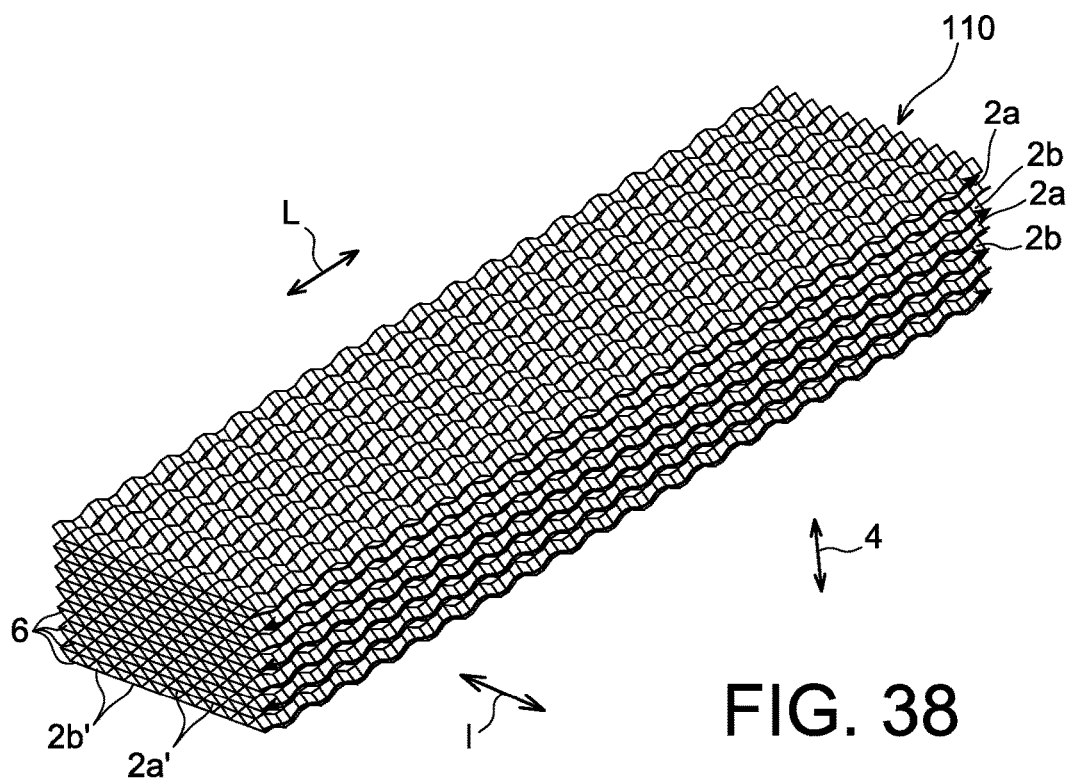
FIG. 38 shows a perspective view of a stacking of membranes and of air circulation networks obtained using the mesh shown in FIGS. 34 to 37.

To do this, each mesh 16a is also undulated according to the direction 4, as can be seen better in FIG. 37. It has a rounded connecting rod 28a, as well as opposite faces 20a also having a curvature on its edges 30a. For each face 20a, a concave edge 30a stems from it, as well as an opposite concave edge 30a defining the hollow 32a. Within the same network, the meshes 16a are all placed in the same direction, for example that of FIG. 34 with the concave edges 30a always oriented upwards.

Regardless of the design retained, it is noted that the stacking has for example twenty superimposed networks 2a, 2b, and nineteen membranes 6 inserted between these networks. The maximum height of the channels 2a', 2b' can be about 5 mm, while the thicknesses of the faces 20a, 22a and of the rods 28a can be about 0.5 mm.

As mentioned hereinabove in reference to FIG. 1, the exchanger 1 comprises, on either side of the stacking 110, air distributors and collectors cooperating with the networks, in such a way as to ensure the distribution and the collection of the two air flows A and B. On each side of the stacking 110 according to the direction "L", another stacking is provided wherein the distributors and the collectors are arranged alternately, according to the direction 4. This alternating is indeed retained in order to ensure the counter-current circulation within the core of the exchanger.

Just as for the networks 2a, 2b, on each side of the stacking of these networks, the distributors 112 and collectors 114 have identical structures, and are stacked alternately in one direction then in the other, in order to obtain the shift of a half-pas enabling them to be nested. On the other hand, for each network, the collector and the distributor associated with this network differ. Indeed, the rectangular air inlet 121a of the distributor and the rectangular air outlet 121b of the collector, which shall be described hereinafter, are symmetrically opposite in relation to the median axis of the exchanger. This allows for a balancing of the aeraulic paths for good irrigation of each channel.

Figure 39:
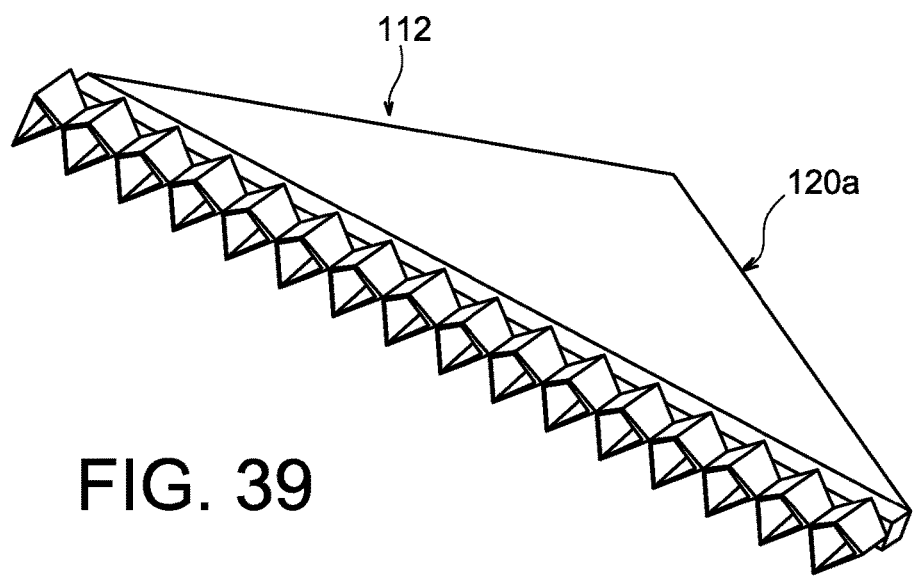
FIGS. 39 and 40 show perspective views of one of the air distributors provided on one of the networks of the stacking, according to two separate viewing angles.
Figure 40:
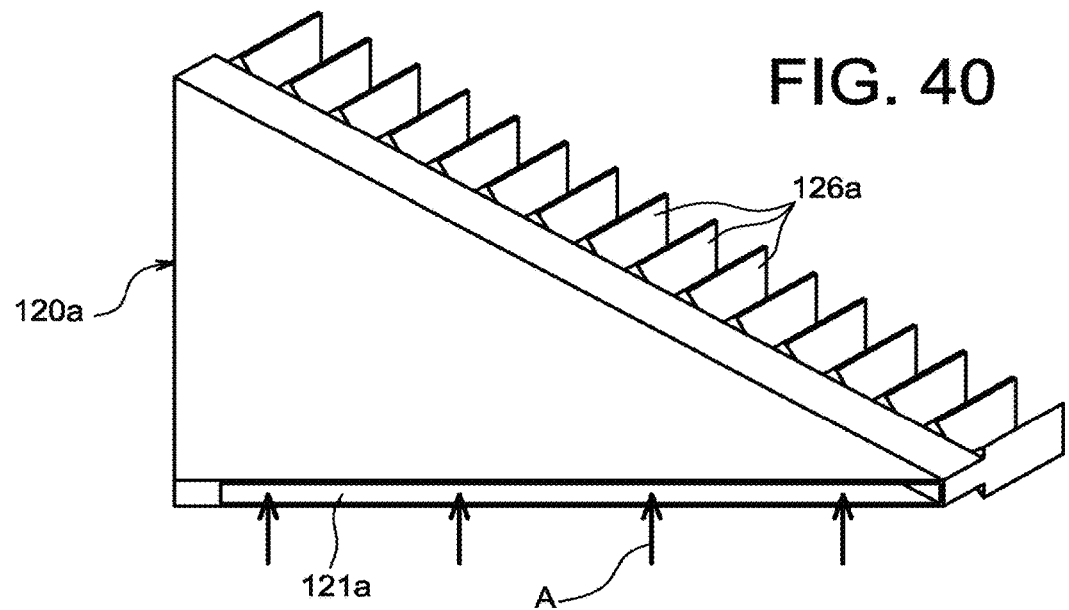
Figure 41:
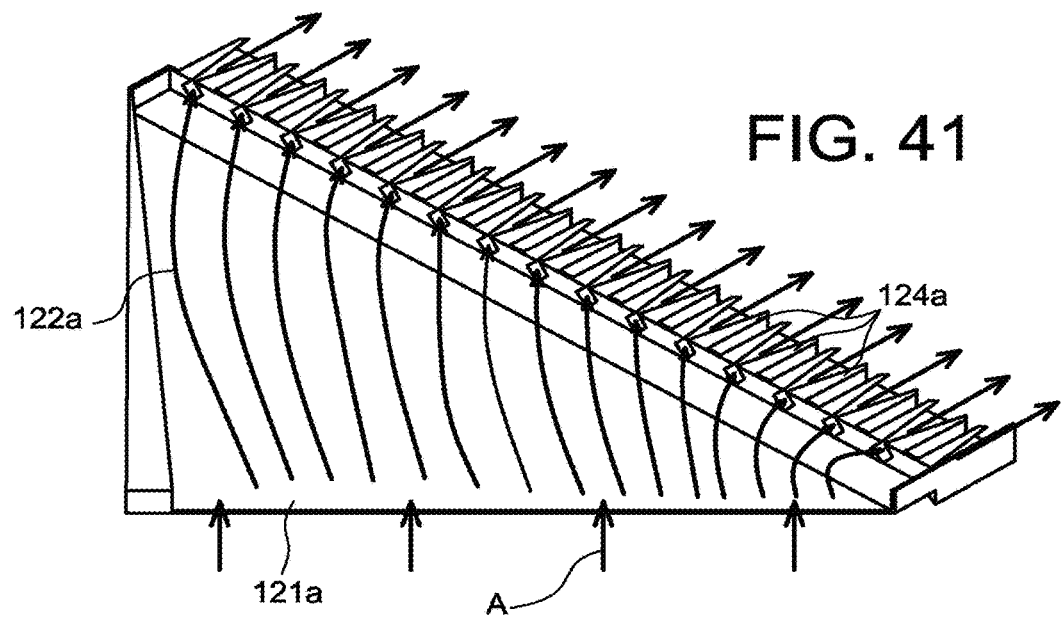
FIG. 41 is a view similar to that of FIG. 40, by being cut according to a plane passing through the air passages.

FIGS. 39 to 41 show an embodiment for one of the air distributors 112, of a globally triangular shape. This distributor 112 has a triangular hollow body 120a with a rectangular air inlet 121a on one of its sides for the intake of the flow A, and an interior volume 122a. On another side of the triangular hollow body 120a, a row of air passages 124a opening into the interior volume 122a is provided, with each passage 124a defined by a wall 126a with a diamond or square shape complementary with that of the channels 2a' present within the networks 2a.

Figure 42:
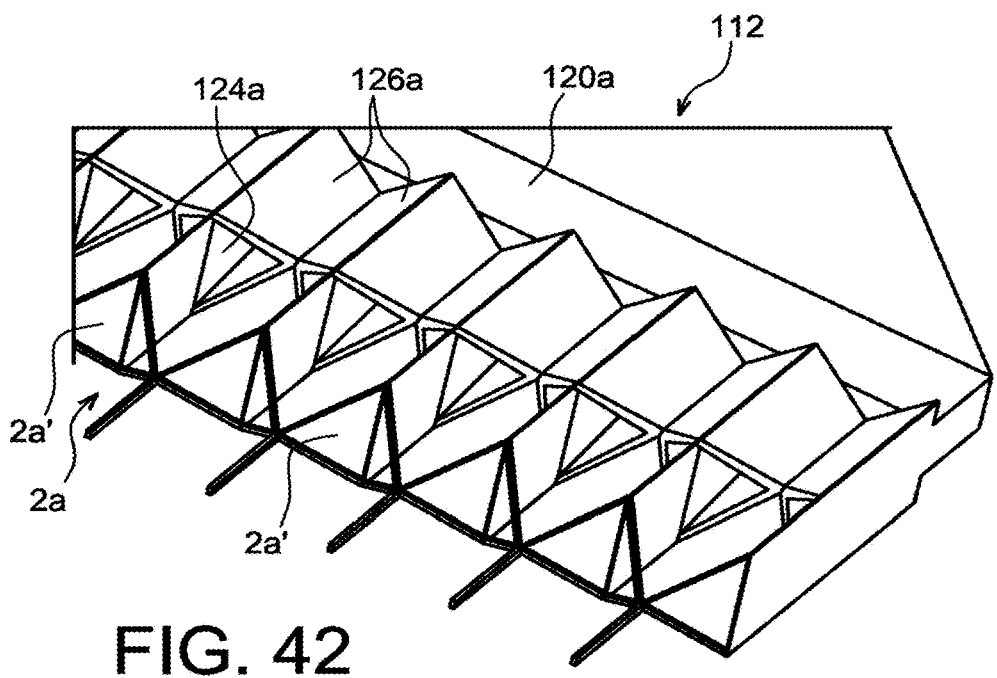
FIG. 42 shows a perspective view of the assembly of the distributor with its associated network.
Figure 43:
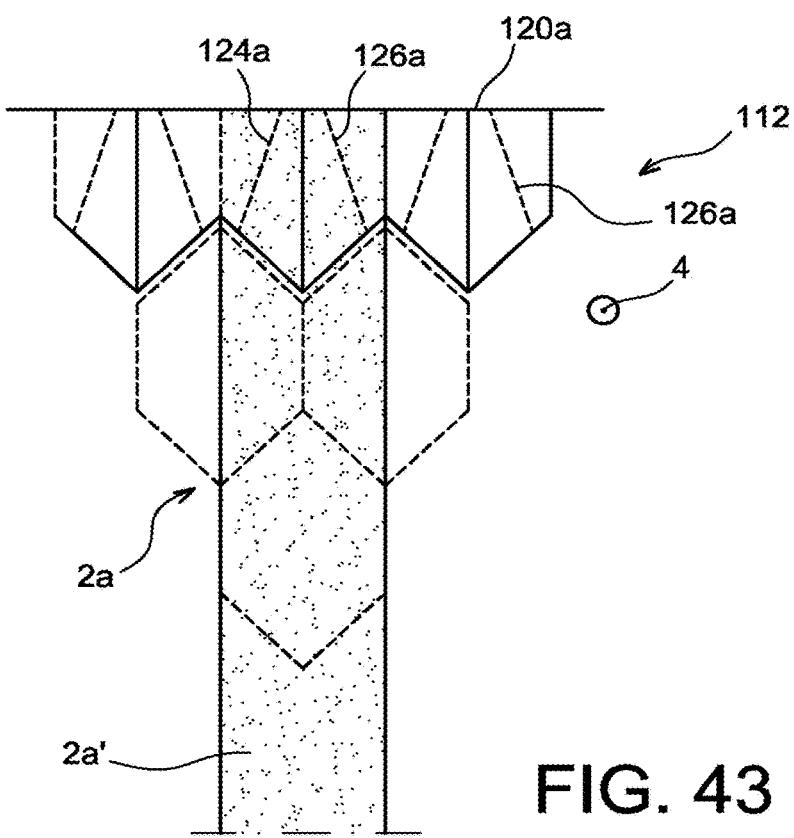
FIG. 43 is a partial view of that of the preceding figure, as a top view.

As has been shown in FIGS. 42 and 43, the distal end of the walls 126a is indented, more preferably as a triangle as viewed along the direction of stacking 4, in such a way as to nest correctly with the structure of the associated network 2a, and in such a way that each channel 2a' is located facing one of the passages 124a. The seal can be provided by a seal (not shown) conveying on the outer surface of the walls 126a, of the section of the triangle signal type. The seal is then placed below or above the membrane 6 covering this outer surface of the row of walls 126a.

Figure 44:
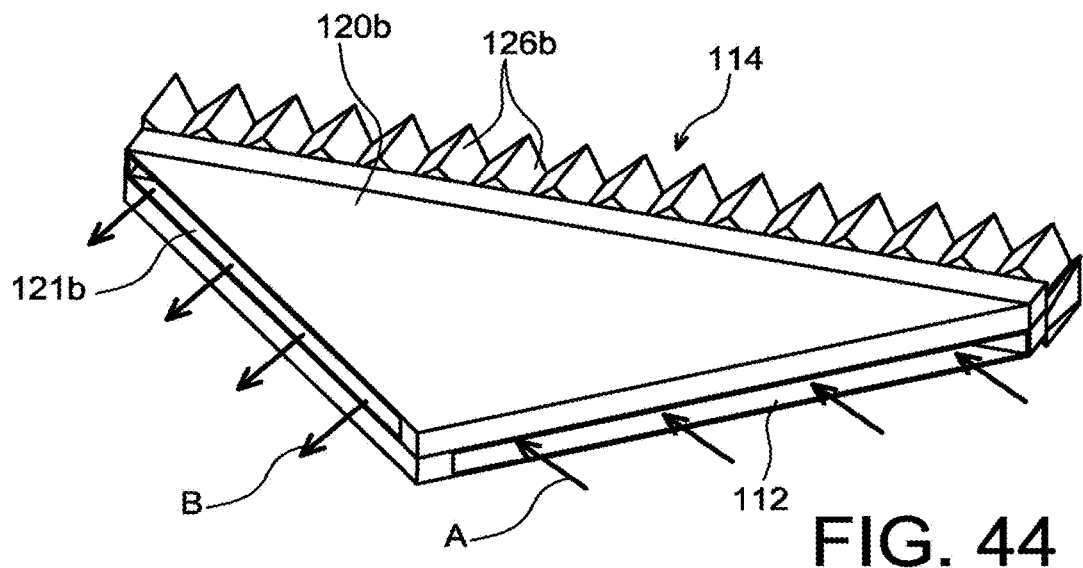
FIGS. 44 and 45 show perspective views of a stacked distributor and of an air collector, respectively provided with two consecutive networks of the stacking, according to two separate viewing angles.
Figure 45:
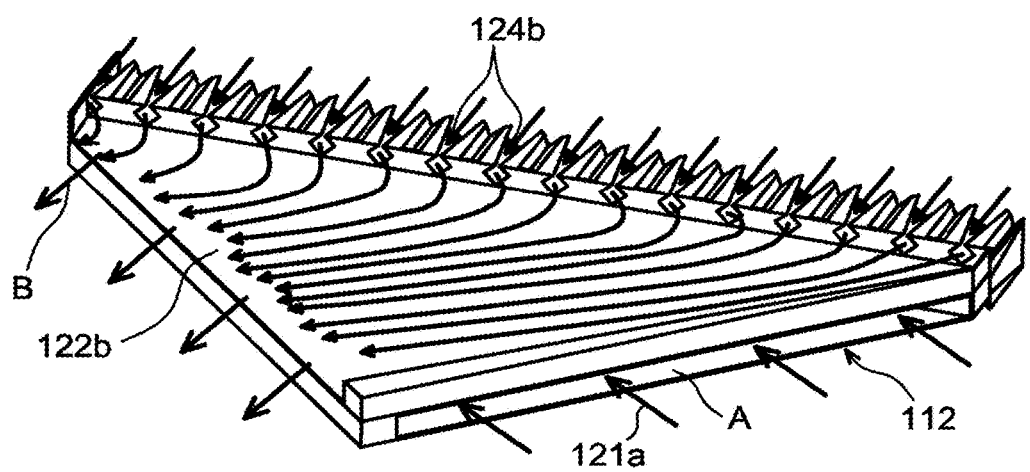

In reference to FIGS. 44 and 45, it is shown that one of the collectors 114 of a design identical to that of the distributor 112, but turned in such a way as to nest with the latter. As such, the air collector 114, of a globally triangular shape, has a triangular hollow body 120b with a rectangular air outlet 121b on one of its sides for the removal of the flow B, and an interior volume 122b. On another side of the triangular hollow body 120b, a row of air passages 124b is provided opening into the interior volume 122a, each passage 124b being defined by a wall 126b with a diamond or square shape complementary with that of the channels 2b' present with the networks 2b.

Figure 46:
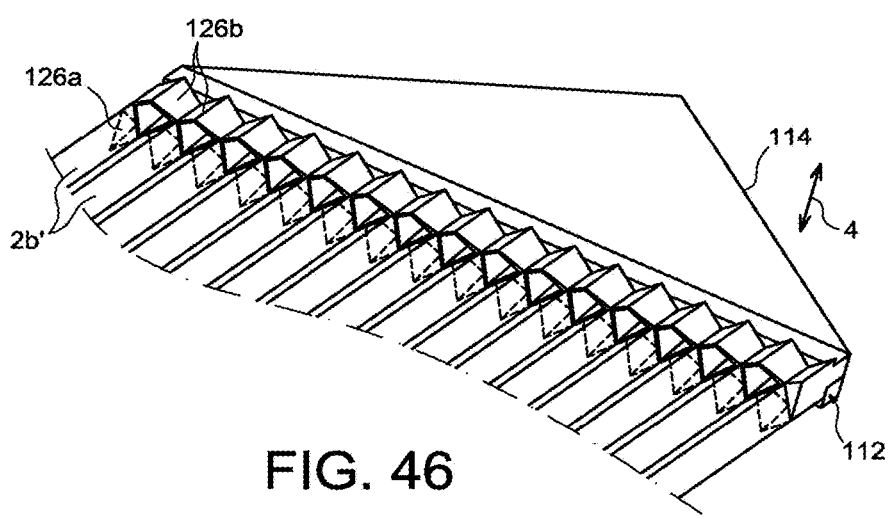
FIG. 46 shows a perspective view of the assembly of the distributor and of the collector with their associated networks.

Thanks to its turned-over position with respect to the distributor 112, the walls 126b as a diamond/square of the collector 114 are nested in the hollows defined between the walls 126a as a diamond/square of the distributor 112. As shown in FIG. 46, this allows each channel 2b' to be located facing one of the air passages defined by the walls 126a. In addition, the nesting of the collector 114 and of the distributor 112 makes it possible ensure the compression of the aforementioned seal, between the outer surfaces facing the walls 126a, 126b.

Of course, various modifications can be made by those skilled in the art to the invention that has just been described, solely by way of non-limiting examples.

The invention claimed is:

1. A dual air flow exchanger, allowing for a heat transfer and a humidity transfer between two air flows, comprising:
   a plurality of first and second air circulation networks stacked alternately according to a direction of stacking and separated two-by-two by membranes permeable to water vapor and impermeable to air and to liquid water,
   each one of the first and second air circulation networks comprising cells each defined by a wall comprising openings for passage of air, the cell wall comprising two opposing edges on which the cell is open in the direction of stacking,
   wherein for at least one of the first air circulation networks, at least one of the two opposing edges of each cell wall defines a hollow open in a direction of the second directly consecutive air circulation network, the hollow receiving a part of the second network.

2. The dual air flow exchanger according to claim 1, wherein for at least one of the second air circulation networks, at least one of the two opposing edges of each cell wall defines a hollow open in a direction of the first directly consecutive air circulation network, the hollow receiving a part of the first network.

3. The dual air flow exchanger according to claim 1, wherein the two opposing edges, of each cell wall of at least one of the circulation networks, each defining a hollow open in a direction of the directly consecutive network, and receiving a part of the directly consecutive network.

4. The dual air flow exchanger as claimed in claim 1, wherein the first and second air circulation networks each have identical structures, and for at least one first and one second directly consecutive networks in the stacking, the structure of the first network is shifted from the structure of the second network in the plane orthogonal to the direction of stacking, to allow the hollow of the first network to receive a part of the second network, and reciprocally.

5. The dual air flow exchanger as claimed in claim 1, wherein each first and second air circulation network is carried out using a mesh which is repeated, the mesh comprising the cell wall.

6. The dual air flow exchanger according to claim 5, wherein the mesh further comprises a connecting rod of the cells.

7. The dual air flow exchanger according to claim 5, wherein the mesh is identical for the first and second air circulation networks.

8. The dual air flow exchanger as claimed in claim 1, wherein each first and second air circulation network has a plane of symmetry orthogonal to the direction of stacking.

9. The dual air flow exchanger as claimed in claim 1, wherein the cells are cylindrical with a non-circular section and axes parallel to the direction of stacking.

10. The dual air flow exchanger as claimed in claim 1, wherein the cell wall has a global hexagon shape when viewed according to the direction of stacking.

11. The dual air flow exchanger according to claim 10, wherein the cell wall has six faces, of which two opposite faces arranged substantially parallel to a main direction of circulation of air through the network concerned, and two pairs of two faces passes through the air, with the two pairs being connected by the two opposite faces.

12. The dual air flow exchanger according to claim 11, wherein the two opposite faces of the cell wall are solid or perforated.

13. The dual air flow exchanger according to claim 11, wherein each pair comprises two faces of a globally triangular shape, with the two faces being connected to one another by one of their vertices.

14. The dual air flow exchanger according to claim 13,
wherein each first and second air circulation network is carried out using a mesh which is repeated, the mesh comprising the cell wall,
wherein the mesh further comprises a connecting rod of the cells, and
wherein the connecting rod is connected to the vertex, from which the connecting rod protrudes in a plane orthogonal to the direction of stacking.

15. The dual air flow exchanger as claimed in claim 1, further comprising, associated with each air circulation network, an air distributor and an air collector, with the distributors and collectors being stacked according to the direction of stacking.

16. The dual air flow exchanger as claimed in claim 1, configured so that circulation of air inside the dual air flow exchanger is carried out at counter-current, or at co-current.

17. The dual air flow exchanger as claimed in claim 1, wherein the membranes are made from a polymer material or from paper.

18. The dual air flow exchanger as claimed in claim 1, wherein the networks are metal or of a polymer material.

19. A system for treating and conditioning air comprising a dual air flow exchanger, allowing for a heat transfer and a humidity transfer between two air flows, the dual air flow exchanger comprising:
a plurality of first and second air circulation networks stacked alternately according to a direction of stacking and separated two-by-two by membranes permeable to water vapor and impermeable to air and to liquid water,
each one of the first and second air circulation networks comprising cells each defined by a wall comprising openings for passage of air, the cell wall comprising two opposing edges on which the cell is open in the direction of stacking,
wherein for at least one of the first air circulation networks, at least one of the two opposing edges of each cell wall defines a hollow open in a direction of the second directly consecutive air circulation network, the hollow receiving a part of the second network.

* * * * *